US011892463B2

(12) United States Patent
Holma et al.

(10) Patent No.: US 11,892,463 B2
(45) Date of Patent: Feb. 6, 2024

(54) SYSTEM AND METHOD FOR MATERIAL DENSITY DISTRIBUTION SURVEY BASED ON COSMIC MUON DETECTION

(71) Applicant: MUON SOLUTIONS OY, Saarenkyla (FI)

(72) Inventors: Marko Holma, Saarenkyla (FI); Pasi Kuusiniemi, Saarenkyla (FI)

(73) Assignee: Muon Solutions OY, Saarenkyla (FI)

( * ) Notice: Subject to any disclaimer, the term of this patent is extended or adjusted under 35 U.S.C. 154(b) by 0 days.

(21) Appl. No.: 17/636,408

(22) PCT Filed: Aug. 24, 2020

(86) PCT No.: PCT/FI2020/050547
§ 371 (c)(1),
(2) Date: Feb. 18, 2022

(87) PCT Pub. No.: WO2021/038129
PCT Pub. Date: Mar. 4, 2021

(65) Prior Publication Data
US 2022/0283068 A1  Sep. 8, 2022

(30) Foreign Application Priority Data
Aug. 23, 2019 (FI) .................................. 20195697

(51) Int. Cl.
*G01N 9/24* (2006.01)
*G01V 5/04* (2006.01)
*G01V 5/00* (2006.01)

(52) U.S. Cl.
CPC .............. *G01N 9/24* (2013.01); *G01V 5/005* (2013.01); *G01V 5/04* (2013.01)

(58) Field of Classification Search
CPC ............. G01N 9/24; G01V 5/005; G01V 5/04
See application file for complete search history.

(56) References Cited

U.S. PATENT DOCUMENTS

| 4,504,438 A | 3/1985 | Levy et al. |
| 2006/0180753 A1* | 8/2006 | Bryman ................... G01V 5/04 250/266 |

(Continued)

FOREIGN PATENT DOCUMENTS

| WO | 2013155075 A1 | 10/2013 |
| WO | 2020198885 A1 | 10/2020 |

OTHER PUBLICATIONS

International Search Report and Written Opinion dated Nov. 6, 2020, from International Application No. PCT/FI2020/050547, 10 pages.

*Primary Examiner* — David P Porta
*Assistant Examiner* — Fani Polyzos Boosalis
(74) *Attorney, Agent, or Firm* — Meunier Carlin & Curfman LLC

(57) ABSTRACT

Provided herein is a system and method designed for measuring and recording, in three-dimensional space, an attenuation of cosmic-ray induced muon particle flux through a material. The attenuation of the said muons determines density variations in the said material in terms of their density, depth, shape and size. The muon data may be combined with various other data types. The passing muons are detected and recorded by one or a plurality of muon detection apparatus designed to be robust and shock resistant. If needed, each individual muon detection apparatus may be controlled remotely or automatically. The muon detection system may be powered by an energy storage device that may be recharged using renewable energy, aggregate or electric grid. The invention comprises methods steps allowing density characterisation of the material in various dimensions, including those over time.

24 Claims, 4 Drawing Sheets

(56) References Cited

U.S. PATENT DOCUMENTS

| | | |
|---|---|---|
| 2011/0035151 A1 | 2/2011 | Botto |
| 2021/0156810 A1* | 5/2021 | Botto .................. G01N 9/24 |
| 2022/0196874 A1* | 6/2022 | Schouten ............... G01V 5/04 |

* cited by examiner

SYSTEM AND METHOD FOR MATERIAL DENSITY DISTRIBUTION SURVEY BASED ON COSMIC MUON DETECTION

CROSS REFERENCE TO RELATED APPLICATIONS

This application is a United States National Phase Patent Application of International Patent Application Number PCT/FI2020/050547, filed on Aug. 24, 2020, which claims the benefit of priority to Finnish Application No. 20195697, filed Aug. 23, 2019, which is incorporated by reference herein in its entirety.

TECHNICAL FIELD

The present invention generally relates to material density investigation based on cosmic-ray muon detection (cosmic ray muography) and more particularly geological structure and density variation investigation based on this investigation method. Cosmic-ray muography can be divided into muon radiography and muon tomography.

BACKGROUND ART

The Earth's atmosphere is constantly bombarded by particles called cosmic rays consisting of high-energy protons and atomic nuclei that interact with the Earth's atmosphere. These interactions generate particle cascades that may contain an extremely large number of secondary elementary particles such as muons. Before decaying the near-light-speed atmospheric muons can penetrate to the Earth's surface. High energy and heavy mass carry muons deep in material with relatively straight trajectories. Depending on the muon energy the penetration depth can be up to kilometres. The number of muons detected underground depends on the depth and the density of material the muons pass through. The muon counting rate from the sky has known angular and energy distributions. Counting the number of muons surviving through the material provides means to measure the density distribution along the line of flight of the muons.

It is seldom possible to determine density variations in natural materials with good accuracy using conventional geophysical survey methods such as gravimetric density surveys. Moreover, the lack of directional (angular) sensitivity in many density measurement techniques hinders density surveys wherever accurate spatial sensitivity is required. For example, borehole gravimetry reveals density information only along the borehole trajectory and from a material column only up to few tens of metres in diameter. Underground muon radiography and muon tomography are capable to extract density information of the material from a much larger volume. Moreover, average rock densities in muon radiography and muon tomography can be determined in specific directions in much greater detail due to directional character of muons in material. Therefore, muon radiography and muon tomography have better spatial accuracy than those methods deploying other existing density mapping techniques. Muons can be detected using different detection techniques such as gaseous ionisation detectors (gas-filled particle detectors), scintillation-based detectors (plastic, liquid and crystal), water Cherenkov and nuclear emulsion-based detectors. Regarding scintillation detectors, there are many possibilities for scintillation materials, both organic and inorganic. Furthermore, the present invention concentrates solely on the scintillation-based muon detection which provides low-energy and low-maintenance tools to extract density variations and are thus much better suited to field operations than other muon detection means, such as gas-filled muon detectors.

For determining the density characteristics of subterranean material, some muon radiography and muon tomography based measurement methods and systems have been proposed. Muon detection-based systems used for characterising subterranean materials are typically in the order of one cubic metre-size instrument that are not designed for to fit boreholes and withstand the harsh conditions in a typical borehole (e.g., water and high hydrostatic pressure). This inherited problem of such instruments (commonly known as "muon telescopes") limits their usage to the areas where there are topographic highs or an access to the underground galleries or tunnels below the volume of interest.

One known problem in the state of the art are requirements arising from varying measurement conditions, such as long distances from an electric power distribution network, have been taken into account poorly if at all. This severely hampers their usage outside the electric power distribution networks.

Another known problem in the state of the art is sparse flexibility of the systems to be utilised in different kinds of material and measurement campaign requirements.

Another known problem in the state of the art is the large size and geometry of such muon detectors. Therefore such muon detectors are utterly unfitting to most commonly used boreholes, such as those of 76.3 mm or less in diameter.

Yet another known problem hampering the present muon detection systems is a large amount of manual labour and logistics and a lot of required operational maintenance (and hence difficult to design to work autonomously), especially while using gas-filled particle detectors.

Technical Problem

It is an object of the invention to implement a method for investigating material densities and a measurement system implementing the method for investigating material densities with the measurement system. The invention solves problems associated with prior art approaches and designs by providing means to probe density differences in materials with a flexible system and method. The measurement system advantageously requires less maintenance and may operate even automatically for extended periods of time. The invented system is centred on scintillation-based detectors.

General Description of the Invention

The present invention relates to a muon detection system (100) for investigating density variations (21) in materials. The density variations (21) in materials are measured using cosmic-ray induced muons according to independent claim 1. The muon detection system (100) comprises:
  at least one muon detection apparatus (10), which muon detection apparatus (10) comprises a scintillation detector part (12), matrix detector (16) and position and orientation apparatus (24),
  which muon detection apparatus (10) is configured to:
  detect in the scintillation detector part (12) emitted photons by the matrix detector (16), which in the scintillation detector part (12) emitted photons result from cosmic-ray induced muon particles passing via a plurality of intersecting muon trajectories (55) through the material situated in a subsurface measurement volume (19) of the muon detection apparatus (10);

which position and orientation apparatus (24) is configured to:
determine the position and orientation of the muon detection apparatus (10) and produce position and orientation data (25) of the muon detection apparatus (10);
wherein the muon detection system (100) further comprises:
at least one DAQ system (13), configured to:
receive operational commands (22);
process the photon signals of detected photons into the form of a muon recording (20); and
send the position and orientation data (25) and the muon recording (20);
at least one supporting system (28), configured to:
position at least one muon detection apparatus (10) to receive the muon recording (20) from the subsurface measurement volume (19);
a processing unit (40), configured to:
send operational commands (22);
collect at least one muon recording (20);
collect the position and orientation data (25) of at least one muon detection apparatus (10);
extract material densities from the subsurface measurement volume (19) by utilising at least one muon recording (20); and
merge extracted material densities from the subsurface measurement volume (19) into a density distribution map.

The invention further relates a method for investigating density variations in studied materials using cosmic-ray induced muons according to independent claim 26. The method comprises steps:
activating a muon detection apparatus (10) by sending operational commands (22) by using a processing unit (40);
receiving the operational commands (22) by using a DAQ system (13);
detecting in a muon detection apparatus (10) located scintillation detector part (12) emitted photons with a matrix detector (16), which emitted photons result from cosmic-ray induced muon particles passing via a plurality of intersecting muon trajectories (55) through the material situated in the subsurface measurement volume (19) of the muon detection apparatus (10);
processing the signals of detected photons into the form of a muon recording (20) by using the DAQ system (13);
determining the position and orientation of the muon detection apparatus (10) and producing position and orientation data (25) of the muon detection apparatus (10) by using a position and orientation apparatus (24);
sending the position and orientation data (25) and muon recording (20) from at least one muon detection apparatus (10) via a communication hub device (36) to the processing unit (40); and
processing at least one muon recording (20) by using the processing unit (40), which processing steps comprises:
collecting at least one muon recording (20);
collecting the position and orientation data (25) of at least one muon detection apparatus (10);
extracting density variations (21) from the subsurface measurement volume (19) by utilising at least one muon recording (20) and position and orientation data (25) of at least one muon detection apparatus (10); and
merging the extracted density variations (21) from the subsurface measurement volume (19) into a density distribution map.

The invention further relates to computer program products for investigating density variations in studied materials according to independent claim 35. One set of computer program products comprise instructions for investigating density variations (21) recorded with the muon detection system (100) and stored on a computer readable medium for performing at least the following:
activating a muon detection apparatus (10) by sending operational commands (22);
receiving operational commands (22);
detecting in a muon detection apparatus (10) located scintillation detector part (12) emitted photons with a matrix detector (16), which emitted photons result from cosmic-ray induced muon particles passing via a plurality of intersecting muon trajectories (55) through the material situated in the subsurface measurement volume (19) of the muon detection apparatus (10);
processing the signals of detected photons into the form of a muon recording (20);
determining the position and orientation of the muon detection apparatus (10) and producing position and orientation data (25);
sending the position and orientation data (25) and the muon recording (20) from at least one muon detection apparatus (10) via a communication hub device (36) to a processing unit (40); and
processing at least one muon recording (20), which processing steps comprises:
collecting at least one muon recording (20);
collecting the position and orientation data (25) of at least one muon detection apparatus (10);
extracting density variations (21) from the subsurface measurement volume (19) by utilising at least one muon recording (20) and position and orientation data (25) of at least one muon detection apparatus (10); and
merging the extracted density variations (21) from the subsurface measurement volume (19) into a density distribution map.

Preferred embodiments of the invention are disclosed in the dependent claims. The invention relates to all possible combinations of preferred embodiments unless explicitly otherwise stated. Moreover, other ways, means and components are also contemplated including but not limited to the present examples.

The advantages of the invention are, for example, that the invention:
allows investigating material densities from small-diameter boreholes 88 (even boreholes 76.3 mm or less in diameter);
allows the muon detection system 100 to be modified depending on the measurement conditions and needs;
allows investigating material densities in the places outside of electric power grids;
allows material density investigations powered by renewable energy;
allows the muon detection system 100 to be modified to be operated remotely;
allows the muon detection system 100 to be modified to be an automatic system;
allows the muon detection system 100 to be modified to constitute a plurality of independent muon detection apparatus 10, each operating in a different borehole 88;
allows the muon detection system 100 to be modified to constitute a plurality of muon detection apparatus 10 in a single borehole 88 as a set of serially interconnected muon detection apparatus 10. This attribute enables a plurality of single-point muon measurements recorded simultaneously reducing the total muon survey duration;

allows the muon detection system 100 to be modified to constitute a plurality of sets of serially interconnected muon detection apparatus 10 positioned simultaneously in a plurality of boreholes 88. This attribute reduces the total survey duration even further;

allows the muon detection system 100 to be modified to perform 2D and 3D imaging of the areas of interest. This attribute enhances the understanding of density distributions in the studied material, even in a short period of survey time;

allows the muon detection system 100 to be modified to perform long-term or even stationary density surveys and density monitoring. The long-term density surveys and density monitoring projects enable time-sequential imaging of the areas of interest. The time-sequential imaging is also called as time-lapse or time-series imaging and it can be used to produce 1.5D density diagrams and 2.5D and 3.5D density maps of the studied material. This attribute enhances the understanding of processes that effectively change material densities over time and hence enables efficient monitoring of temporal variations in material densities;

allows the different muon detection apparatus 10 in one or a plurality of boreholes 88 in the same muon detection campaign site to be operated via a single set of connected advantageous auxiliaries that reduce power consumption;

allows the muon detection system 100 to be modified to be used in boreholes 88 drilled from an underground gallery, such as a tunnel, cave and the like;

allows the muon detection system 100 to be modified to be used in boreholes 88 drilled in any direction, including upwards drilled boreholes 88;

allows the muon detection system 100 to be operated in both dry and water-filled boreholes 88, as well as in boreholes 88 that are equipped with a pipe (so-called casing) and with those that are not cased;

allows the muon detection system 100 to be modified to be used in boreholes 88 that have underwater collars (starting points). Examples of such boreholes 88 include those drilled into the bottom of the sea, lake or river and those presently located in flooded open pits or flooded underground mines;

allows one or a plurality of muon detection apparatus 10 to be transported to their desired measurement positions by robotic means;

allows the muon detection system 100 to be modified to be used in asteroids, moons, Mars or other celestial objects.

BRIEF DESCRIPTION OF THE DRAWINGS

In the following the invention is described in detail, by way of examples and exemplary embodiments, with the reference to the accompanying drawings in which.

DESCRIPTION OF PREFERRED EMBODIMENTS

Figure 1:
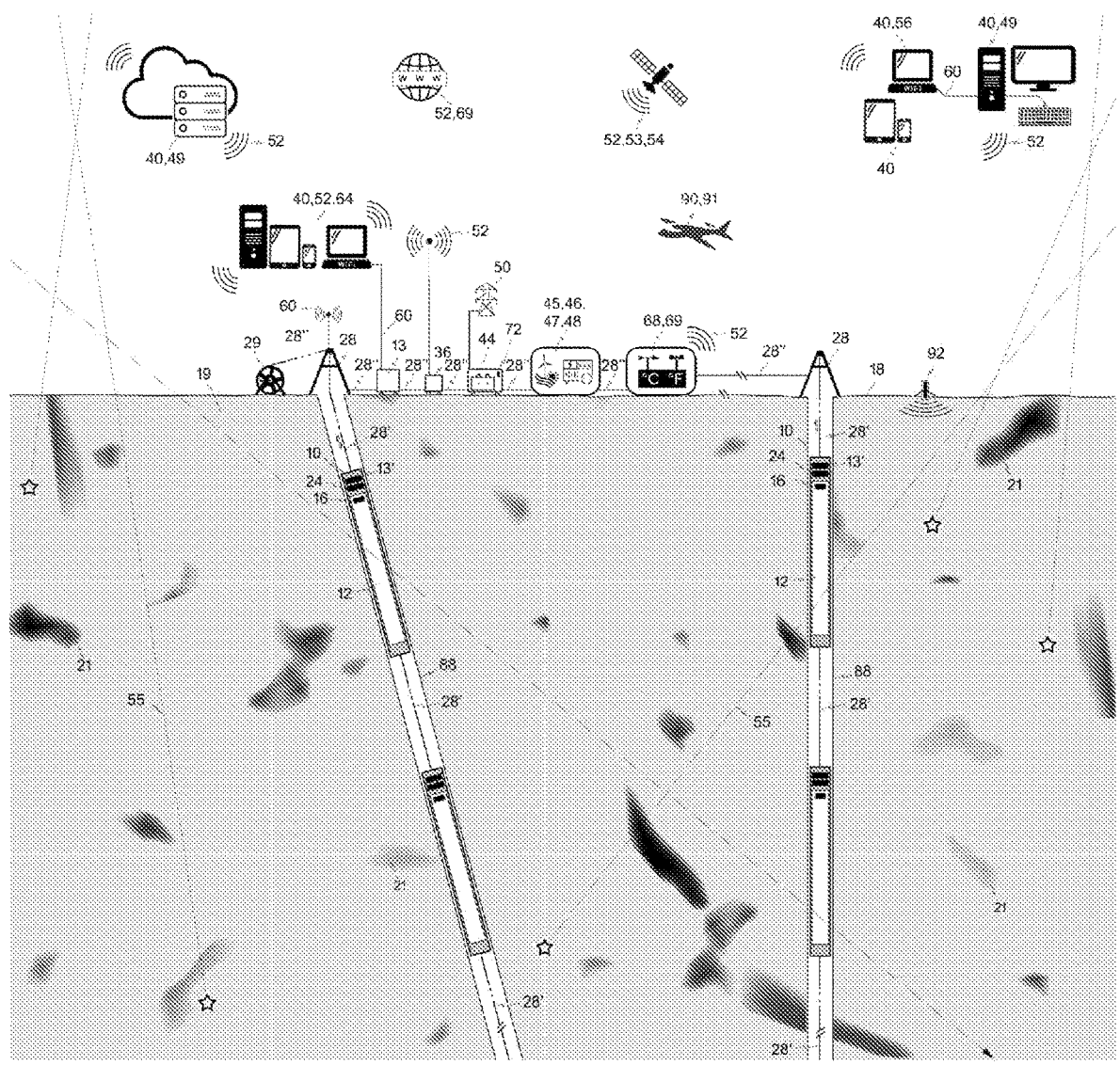
FIG. 1 shows some functional elements of an exemplary muon detection system 100 according to the invention.

The embodiments in the following detailed description of the muon detection system 100 and the invention as a whole are examples only. Hence someone skilled in the art can implement the basic idea of the invention also in some other manner than that explained in the description. Most embodiments can be actualised in a variety of combinations with other embodiments. Most embodiments may also contain a number of connected advantageous auxiliaries, or no such auxiliaries at all. Though the description may refer to a certain embodiment or embodiments in several places, this does not imply that the reference is directed towards only one described embodiment or that the described characteristic is usable only in one described embodiment. The individual characteristics of a plurality of embodiments may be combined and new embodiments of the invention may thus be provided.

In order to assist to fully understand the invention, the presented exemplary embodiments and detailed description, some detailed terms repeatedly used hereinafter to describe the invention may need early clarifications.

The terms "borehole" and "drilling" are to be understood in a broad sense and the terms "borehole" and "drill hole" as interchangeable terms. A person skilled in the art distinguish that boring and drilling can be technically conducted in a variety of ways and that boreholes and drill holes are not always made with the same type of technology.

The expression "muon counting rate" is used to measure the number of muons passing through a given area (e.g., the cross-section of the muon detector volume) within a given period of time. Sometimes this is also limited by the muon angle of arrival. The muon counting rate through a one square metre area is sometimes called "muon flux". The muon flux can be determined, for example, at the sea level or inside a material at certain depth. The latter is valid also in celestial objects, such as asteroids, planets and moons. If there is no atmosphere, the surface of the object acts as a media where the muons are generated.

The term "surface" is to be understood in a broad sense. Depending on the case the surface may be, for example, a ground surface 18, a cave or tunnel floor surface, or any other type of surface. The surface may also be a surface of a man-made object or structure.

The term "computer program product" is to be understood in a broad sense meaning all sorts of software. Depending on the case software may include at least one selected from a computer program, computer code, computer script, computer macro, computer library, algorithm or user interface.

The expression "subsurface measurement volume" refers to the volume of material muons pass through before being detected by the muon detection apparatus 10. The volume of the subsurface measurement volume depends on the number of used muon detection apparatus 10 and their mutual positions in three dimensions (3D).

The term "administrator" refers to the administrator of the muon detection system 100 and the invented muography method. The administrator is a qualified person authorised to control the operation of the invention using, for example, the operational commands 22 and operational parameters 23. The administrator has also a complete access to the system level diagnostics such as operational variables 31.

The expression "Quality Assurance/Quality Control (QA/QC)" concerns all data and information generated and obtained using the invention and it is used to ensure the quality of data and information. All data and information generated and obtained using the invention are exposed to various QA/QC tests, checks and procedures.

The present invention permits density studies in a volume of materials (like soil, rock or concrete) enabling, for example, scientific research, mineral exploration, oil and gas exploration, groundwater exploration and studies of structures and density variations in materials. The present invention may be applied to investigate material densities and density variations up to kilometres beneath the surface. In brief, the material densities are investigated by studying the attenuation of cosmic-ray induced muon particles in materials by utilising boreholes 88, even though boreholes 88 are not necessary in all embodiments and applications. Muon measurements with the muon detection system 100 provide means to locate and characterise density variations in material in terms of size, depth and shape.

The recorded muon data (so-called "muon measurement data") comprises signals of muon-induced photons combined with information on the position and orientation of the muon detection apparatus 10 (so-called "position and orientation data 25") at the time of each recorded muon passing. The muon measurement data are recorded in a computer-readable format and may further be combined with other type of information regarding the surrounding material, including many types of geophysical, geological, mineralogical, geochemical, (geo)engineering and structural data. The recorded muon data may advantageously also be combined with other muon data from the measurement location, which other muon data may possibly be produced with different data acquisition means and techniques (e.g., muon data acquired by a muon telescope or a plurality of muon telescopes). By utilising the data processing and visualisation methods it is possible to estimate material densities and density variations, and merge densities and density variations into density distribution maps and time-sequential density distribution maps. The recorded muon data may also be combined with conventional meteorological measurement data 69, such as temperature, atmospheric pressure, humidity and wind speed and wind direction. The meteorological data may be useful for predicting and understanding the behaviour of the muon detection system 100. However, more important than the meteorological data are the internal temperature, pressure and humidity data from the muon detection apparatus 10 as those are useful for the QA/QC system checks and especially in cases of device failures or malfunction. Yet other data that may advantageously be combined with the recorded muon data are those from a voltage measurement device 72 that provides a status of the voltage of an electrical energy storage device 44.

The muon detection apparatus 10 detects cosmic-ray induced muons and determines their arrival angles. The muon counting rate can be used for producing density distribution data concerning the studied media. The data recorded using the muon detection apparatus 10 are hereinafter called a "muon recording 20". The muon recording 20 includes the data of all muons detected at one position using one muon detection apparatus 10. The muons detected in a plurality of positions with one or a plurality of muon detection apparatus 10 forms collectively a collection of muon recordings 20.

One of the simplest density measurement employing muons with the muon detection apparatus 10 produces a time-sequential density diagram annotated hereinafter as a one-and-a-half-dimensional (1.5D) diagram where the letter D indicates dimension while the half dimension indicates time. In a 1.5D time-sequential density diagram the muon counting rate is plotted as a function of time in a X-Y diagram. Time or a period of time is usually plotted in the horizontal axis. Muon counting rates are measured and usually presented as periods of equal duration. A 1.5D time-sequential density diagram is hence a simple diagram that effectively indicates whether or not the muon recording 20 contains time-sequential changes in the average density of the studied media. If the average density remains constant during the muon detection, a 1.5D time-sequential density diagram shows a flat muon counting rate distribution. However, if the average density of the studied media indeed changes during the muon detection, a 1.5D time-sequential density diagram shows an uneven muon counting rate distribution. The 1.5D time-sequential density diagrams are time-sequential in character, regardless whether or not this is of interest. This inherited characteristic means that the 1.5D time-sequential diagrams are a useful tool for QA/QC.

Simple information of the muon counting rate can also be translated into a two-dimensional (2D) density distribution map. Such 2D density distribution maps may be further processed into a series of time-sequential density distribution maps annotated hereinafter as a two-and-a-half-dimensional (2.5D) map where the letter D indicates dimension while the half dimension indicates time. In 2.5D density distribution maps time is treated as a variable. This allows visualisation of muon measurement data as a series of snapshots, a discrete video or as a frozen map. In the frozen maps the time-sequential information is simply not considered, which effectively renders the analysis and visualisation from 2.5D to 2D. Similar procedures may be applied to three-dimensional (3D) density distribution maps, which may be translated into three-and-a-half-dimensional (3.5D) time-sequential density distribution maps.

Time-sequential natural processes capable to change densities within the time scale of the muon detection campaign are not particularly common in geological realms, since most density-changing geological processes are events occurring on a geological timescale spanning from thousands to millions of years. There are, however, some notable exceptions, such as volcanic eruptions, earthquakes, landslides and groundwater flow. Therefore, the 2.5D and 3.5D time-sequential density distribution maps are sometimes required in the studies of density-changing natural geological processes detectable in the timescale of the muon detection. Other important applications of 2.5D and 3.5D time-sequential density distribution maps are the studies and monitoring of the temporal variations in, for example, anthropogenic processes and man-made constructions detectable in the timescale of the muon detection.

Some operational procedures of the muon detection system 100 can be decentralised, i.e., some operational procedures may be performed by a series of operations in more than one location. However, even though decentralisation of some operational procedures of the muon detection system 100 are possible, and in some cases indeed even required, not all embodiments of the invention require decentralisation. Examples of such decentralised setups include the DAQ (data acquisition) system 13 and supporting system 28. An exemplary DAQ system 13 consists of the surface part of the DAQ system 13 and the detector part of the DAQ system 13. For clarity, the different parts of the DAQ system 13 are referenced as the "DAQ system 13", i.e., their actual locations are not singled out unless a definite description is required, in which case the given device location is provided. One also notes that while the muon detection system 100 in a given muon detection campaign site may contain only one surface part of the DAQ system 13 there may simultaneously be a plurality of detector parts of the DAQ system 13 in operation. The DAQ system 13 includes a DAQ computer that operates DAQ software, which in turn commands the DAQ system 13, hence also the surface part of the DAQ system 13 and the detector part of the DAQ system 13. An exemplary supporting system 28 consists of two parts: the surface part (such as peripheral connecting cables 28" and a tripod) and borehole part (detector connecting cables 28'). The supporting system 28 can be constructed in numerous ways and most parts are optional and even the detector connecting cable 28' can be replaced by a simple rope. The supporting system 28 may also include a positioning device 29, which is another optional component.

FIG. 1 depicts some functional elements of an exemplary muon detection system 100 according to the invention. FIG. 1 shows an example of two sets of serially interconnected muon detection apparatus 10 placed in two boreholes 88 drilled into the ground from the ground surface 18. In the following description the inventive muography method and system are depicted by utilising the borehole 88 as an example for the possible location of muon detection apparatus 10 to investigate material densities. However, the material density investigating method and system also enables the muon detection apparatus 10 to be advantageously positioned inside a man-made construction or an aquatic system in order to investigate surrounding material densities therein. The potential applications of the invention are not even Earth-bound since the system 100 may also work in such extraterrestrial objects as asteroids, moons and Mars.

Some boreholes 88 are cased to prevent structural collapse. Such casing does not prevent operating the muon detection apparatus 10 in the borehole 88.

The detector body protects a muon detection apparatus 10 from possibly harsh environmental conditions, such as corrosive reagents, gases, extreme pressures, water and stray light and other counterproductive electromagnetic radiation. The corrosive reagents are of special interest, for example, in those mines and mineral exploration sites where there are mineralised rocks containing sulphides or saline minerals. The detector body also advantageously protects a muon detection apparatus 10 from scratches and mechanical impacts. The protection from the mechanical impacts may also include means for shock absorption of mechanical shocks. The material the detector body is made of depends on the surroundings a muon detection apparatus 10 is positioned.

In one preferred embodiment a muon detection apparatus 10 is completely sealed from the outside. Thus it is also waterproof. The detector body may be made of metal, plastic, carbon fibres, fullerenes (such as carbon nanotubes) and the like.

Although many cosmic-ray induced muon particles pass through the Earth's atmosphere all the time and penetrate with relatively straight trajectories into material where the muons finally decay, only some muon trajectories 55 have been drawn in FIG. 1 for clarity reasons. In FIG. 1 a star at the end of muon trajectory 55 illustrates the decay of a muon, whereas an arrow illustrates that the decay takes place deeper in the ground.

FIG. 1 shows the supporting system 28 that is a decentralised setup. Its purpose is to provide support to the muon detection system 100. Here the terms "support" and "supporting" refer to both physical support and operational support. Both physical support and operational support of the supporting system 28 are features that often occur simultaneously and are indistinguishable.

In FIG. 1, the supporting system 28 advantageously functions as a support for the detector connecting cable 28'. The notation 28' is used to signify that the whole supporting system setup can comprise more than one part. Moreover, the notation 28' indicates the given connecting cable is connected to the muon detection apparatus 10. The notation 28", on the other hand, indicates the peripheral connecting cable 28" is located outside the borehole 88 (e.g., on ground or on a tunnel floor). Each detector connecting cable 28' may comprise one or a plurality of individual detector connecting cable 28' segments. Each peripheral connecting cable 28" may comprise one or a plurality of individual peripheral connecting cable 28" segments.

In one preferred embodiment the supporting system 28 is decentralised by distributing the supporting system 28 partially on the surface (as peripheral connecting cables 28") and in the borehole 88 (as detector connecting cables 28').

In another preferred embodiment a supporting system 28 comprises a tripod. This tripod may also act as a mechanical support for connected advantageous auxiliaries, such as a windmill 46, solar panel 45 and communication antenna connected to local connection means 60 and/or a communication network 52.

In one simplified version of the supporting system 28 the supporting system 28 is a rope coupled to the muon detection apparatus 10. In this case the rope is used to lower the muon detection apparatus 10 to the desired depth and secure its position for the duration of the muon detection campaign. The same rope is also used for reaching the recorded data by lifting the connected muon detection apparatus 10 up using the rope. In another simple version of the supporting system 28 the supporting system 28 may be constituted of a rope, antenna and antenna cable. In yet another version the supporting system 28 is equipped with a positioning device 29.

In the example of FIG. 1 the supporting system 28 is advantageously configured to position two sets of serially interconnected muon detection apparatus 10 in two boreholes 88 in order to receive muon measurement data from two sets of serially interconnected muon detection apparatus 10. The number of interconnected sets of serially interconnected muon detection apparatus 10 in a given muon detection campaign site is solely limited by the number of available supporting systems 28 and sets of connected advantageous auxiliaries. These connected advantageous auxiliaries may include a plurality of devices such as the communication hub device 36, solar panel 45, windmill 46, hydroelectric power generator 47, aggregate 48, local computer 64, weather station 68 and voltage measurement device 72 connected to at least one selected from the muon detection apparatus 10, DAQ system 13, supporting system 28 and electrical energy storage device 44. Some of these connected advantageous auxiliaries may be controlled by auxiliary computer program products that monitor the performance of the muon detection system 100.

The muon detection apparatus 10 may be transported to the muon detection campaign site within a transport case, transport box or transport container that can be cooled or heated according to the requirements in order to protect the muon detection apparatus 10 against extreme temperatures. The said transport case, transport box or transport container may also be cushioned, insulated or both.

The number of muon detection apparatus 10 in a set of serially interconnected muon detection apparatus 10 is not limited as long as the structural integrity of the supporting system 28 is maintained. The distance between two muon detection apparatus 10 within a set of serially interconnected muon detection apparatus 10 may vary depending on the muon detection campaign requirements. Evidently, instead of a set of serially interconnected muon detection apparatus 10, it is possible to position only one muon detection apparatus 10 in a borehole 88.

In the example of FIG. 1 the supporting system 28 is connected to the surface part of the DAQ system 13 via a plurality of peripheral connecting cable 28".

In FIG. 1 the muon detection apparatus 10 are serially interconnected via a plurality of detector connecting cables 28'. The detector connecting cable 28' may be a single cable or it may constitute of a series of individual cable segments of the detector connecting cable 28'. In the case of a single cable, various structural designs means may be applied to guide the detector connecting cable 28' pass the individual muon detection apparatus 10, including a design based on a structure in which the detector connecting cable 28' pierces through all the muon detection apparatus 10. In most designs, the uppermost muon detection apparatus 10 is connected to the supporting system 28 via a detector connecting cable 28'. In some designs no detector connecting cables 28' are needed as the muon detection apparatus 10 are positioned to their desired measurement positions in a borehole 88 by robotic means (this is, however, not illustrated in FIG. 1).

In FIG. 1 an optional auxiliary positioning device 29 connected to the supporting system 28. The positioning device 29 is used to position one or a plurality of interconnected muon detection apparatus 10 in the borehole 88 by adjusting the length of a rope or the uppermost detector connecting cable 28'. If the positioning device 29 is not used, its tasks are accomplished by the supporting system 28. The positioning device 29 is a sophisticated version of one feature of the supporting system 28 intended to position the muon detection apparatus 10. A typical positioning device 29 is a winch of which mechanism allows to lower one or a plurality of muon detection apparatus 10 into a borehole 88. There are many different positioning devices available in the market. While the simple models are manually operated, more sophisticated models equipped with a motor offer flexibility and even automatised operability. One simple positioning device 29 is a stationary object where a rope or the uppermost detector connecting cable 28' is attached.

In one preferred embodiment the positioning device 29 comprises a rope that connects one or a plurality of muon detection apparatus 10 to the surface.

In another preferred embodiment the positioning device 29 comprises a simple pulley that steers a rope or the uppermost detector connecting cable 28' to the borehole 88 so that one or a plurality of muon detection apparatus 10 is connected to the surface.

In yet another preferred embodiment the positioning device 29 comprises a rope or the uppermost detector connecting cable 28' combined with a winch. The winch may be, for example, a manual or motorised rope or a cable winch.

In the example of FIG. 1 the detector connecting cable 28' and peripheral connecting cable 28" comprises all required data transferring and powering means as well as mechanical means for the detector connecting cable 28' for positioning the muon detection apparatus 10.

In one preferred embodiment the peripheral connecting cable 28" and detector connecting cable 28' are of the same type.

In another preferred embodiment the supporting system 28 comprises means for adapting a detector connecting cable 28' and peripheral connecting cable 28". These adapting means may comprise, for example, means for adapting electricity delivered via the peripheral connecting cable 28" to the detector connecting cable 28'. Adapting means may also comprise means for adapting data transfer between the peripheral connecting cable 28" and detector connecting cable 28'. Adapting means also comprise means for adapting the position (e.g., depth) of the muon detection apparatus 10.

In another preferred embodiment the detector connecting cable 28' encloses only a mechanical cable, configured to position the connected muon detection apparatus 10.

In another preferred embodiment the muon detection apparatus 10 comprises an integrated electrical energy storage device 44 (not drawn in FIGS. 1-2 for clarity reasons), configured to deliver electricity to the muon detection apparatus 10. The muon detection apparatus 10 further comprises an integrated voltage measurement device 72 configured to measure the voltage of the integrated electrical energy storage device 44. In this preferred embodiment, the muon measurement data may be transferred retrospectively after the measurement and processed further according to the method of the invention.

In another preferred embodiment the invention includes a transfer of information on a status of the voltage of the electrical energy storage device 44 to a processing unit 40. The data are measured by using a voltage measurement device 72.

In another preferred embodiment the electrical energy storage device 44 is recharged by utilising at least one source of power selected from a solar panel 45, windmill 46, hydroelectric power generator 47 or an aggregate 48.

In another preferred embodiment the detector connecting cable 28' encloses an electric cable, configured to deliver electricity to the connected muon detection apparatus 10 and a mechanical cable, configured to position the connected muon detection apparatus 10.

In another preferred embodiment the detector connecting cable 28' encloses a data transfer cable, configured to transfer data (but no electricity), and a mechanical cable, configured to position the connected muon detection apparatus 10. In this preferred embodiment of the invention the muon detection apparatus 10 comprises an integrated electrical energy storage device 44. The latter is configured to deliver electricity to the muon detection apparatus 10.

In another preferred embodiment the detector connecting cable 28' comprises means for data transfer, delivering electricity to the connected muon detection apparatus 10 and positioning the connected muon detection apparatus 10.

In yet another preferred embodiment the distance between two successive muon detection apparatus 10 may be controlled by adjusting the length of their respective detector connecting cable 28'.

The muon detection system 100 according to the invention may be assembled advantageously such that it comprises only one muon detection apparatus 10. The muon detection apparatus 10 can be connected to a set of connected advantageous auxiliaries.

In one preferred embodiment the supporting system 28 is configured to reposition one muon detection apparatus 10 to receive the muon recordings 20 from a plurality of positions in the subsurface measurement volume 19.

The muon detection system 100 according to the invention may advantageously be assembled such that it comprises one set of serially interconnected muon detection apparatus 10 or a plurality of sets of serially interconnected muon detection apparatus 10, each set of serially interconnected muon detection apparatus 10 positioned in a different borehole 88. Each set of serially interconnected muon detection apparatus 10 may be connected to the same set of connected advantageous auxiliaries, to separate sets of connected advantageous auxiliaries or partially shared advantageous auxiliaries.

In one preferred embodiment the number of muon detection apparatus 10 in a single set of serially interconnected muon detection apparatus 10 and the number of sets of serially interconnected muon detection apparatus 10 can be varied.

The muon detection apparatus 10 can be deployed in boreholes 88 inclined from vertical to horizontal. For those boreholes 88 drilled horizontally, horizontally with a low to intermediate angle, upwards vertically or upwards with an angle, the muon detection apparatus 10 needs to be moved with other, typically mechanical means such as drill rods. If a plurality of muon detection apparatus 10 are used simultaneously in a single upwards drilled borehole 88, such a set of serially interconnected muon detection apparatus 10 can be stiffened by mechanical means allowing muon measurements in such a borehole 88. Furthermore, robotic means may be used to transport one or a plurality of muon detection apparatus 10 to their desired measurement positions in a borehole 88. Such robotic means may be used for appropriate boreholes of any inclination.

In one preferred embodiment the muon detection apparatus 10 may be positioned by robotic means in a borehole 88, tunnel, asteroid and the like. The positioning of the muon detection apparatus 10 by robotic means may be executed also without a borehole 88, assuming there is space for the muon detection apparatus 10.

In the example of FIG. 1 each muon detection apparatus 10 comprises the scintillation detector parts 12, matrix detector 16, detector part of the DAQ system 13 and position and orientation apparatus 24. A muon detection apparatus 10 is configured to detect emitted photons in the scintillation detector part 12 by one or a plurality of matrix detectors 16. These in the scintillation detector part 12 emitted photons result from cosmic-ray induced muon particles passing via a plurality of intersecting muon trajectories 55 through the material situated in the subsurface measurement volume 19 and subsequently passing through the scintillation detector part 12 of the muon detection apparatus 10.

As a cosmic-ray induced muon particle passes through the scintillation detector part 12, its passing (or track) is recorded as the muon recording 20 that contains information on its time stamp and the position and orientation of the muon detection apparatus 10 at the event of the muon passing. Most scintillation materials, which can be used in the scintillation detector part 12, are organic materials either in solid or liquid phase or inorganic crystals. The detection of muon particles in the scintillation detector part 12 is based on the detection of photons (i.e., light) emitted by a muon passing through the scintillation material within the scintillation detector part 12. One muon may produce thousands of photons while passing through the scintillation material. The advantages of plastic, liquid and crystallic scintillation materials in the muon detection are good time resolution, high detection efficiency and low-maintenance operation. The time resolution is the ability to distinguish two passing muons by time, i.e., not to confuse two independent photon signals as a passing of a single muon.

A matrix detector 16 may comprise a SiPM (silicon photomultiplier), PIN diode, PMT (photomultiplier tube), APD (avalanche photodiode), LDR (light depended resistor), CCD (charge coupled device) cell, MPPC (multi-pixel photon counter), CMOS (complementary metal oxide semiconductor) cell, pyrodetector and the like. For clarity, only one matrix detector 16 per a single muon detection apparatus 10 has been drawn in FIG. 1. However, it is a common practise to equip one muon detection apparatus 10 with a plurality of matrix detectors 16.

In one preferred embodiment the scintillation detector part 12 may comprise an optical fibre, or a plurality of optical fibres, with which emitted light may be transferred to a light-detecting matrix detector 16.

The position and orientation apparatus 24 is configured to determine the position and orientation of the muon detection apparatus 10. The position and orientation apparatus 24 is further configured to produce the position and orientation data 25 of the muon detection apparatus 10.

The position and orientation data 25 of the muon detection apparatus 10 are used to correct for the arrival angles of muons according to the used standard reference frame. Furthermore, if the position and deviation details concerning the borehole 88 itself are—for one reason or another—not known, the position and orientation data 25 recorded during the operation of the muon detection apparatus 10 can be used to obtain information of the position and deviation of the borehole 88.

The muon measurement data comprises signals of muon-induced photons in a computer-readable format. The muon measurement data are comprised of two types of data: the muon recording 20 and the position and orientation data 25 of the muon detection apparatus 10.

In one preferred embodiment the measured data include muon measurement data that comprises of the muon recording 20 and the position and orientation data 25. The measured data may also include, for example, operational variables 31, a status of voltage from the voltage measurement device 72 that monitors voltage levels of the electrical energy storage device 44, and meteorological measurement data 69 from a weather station 68.

The muon detection system 100 comprises the DAQ system 13 that is configured to receive operational commands 22 and operational parameters 23 from a processing unit 40. In most embodiments this is carried out by receiving the operational commands 22 and operational parameters 23 by a DAQ computer in the surface part of the DAQ system 13, although in some embodiments the DAQ system 13 is placed solely in the muon detection apparatus 10. In the latter case the DAQ computer is in the muon detection apparatus 10 and receives operational commands 22 and operational parameters 23 from a processing unit 40 before the muon detection apparatus 10 or a plurality of muon detection apparatus 10 is disconnected from a processing unit 40.

The DAQ system 13 is further configured to process the signals of detected photons into a form of the muon recording 20 in different parts of the DAQ system 13. The detector part of the DAQ system 13 is configured to send the muon recording 20 to the DAQ computer of the surface part of the DAQ system 13, unless the whole DAQ system 13 is placed solely in the muon detection apparatus 10. In the latter case the DAQ computer is in the muon detection apparatus 10 and stores the muon recording 20 for future uploading.

The DAQ system 13 is further configured to send the position and orientation data 25 of the muon detection apparatus 10 to the DAQ computer of the surface part of the DAQ system 13, unless the whole DAQ system 13 is placed solely in the muon detection apparatus 10. In the latter case the DAQ computer is in the muon detection apparatus 10 that stores the position and orientation data 25 for future uploading.

The DAQ system 13 is further configured to send the muon recording 20 and position and orientation data 25 from the DAQ computer of the surface part of the DAQ system 13 for further data processing in a processing unit 40. These two operations may be executed separately or the muon recording 20 and the position and orientation data 25 may be combined at the muon detection campaign site. If the muon recording 20 is combined with the position and orientation data 25 at the muon detection campaign site, this combining is executed in the DAQ computer of the surface part of the DAQ system 13, a local computer 64 and the like, unless the whole DAQ system 13 is placed solely in the muon detection apparatus 10. In the latter case the DAQ computer is in the muon detection apparatus 10 that stores the muon recording 20 and the position and orientation data 25 or the combined muon recording 20 and the position and orientation data 25 for future uploading.

In one preferred embodiment the DAQ system 13 advantageously receives operational parameters 23 concerning the muon detection apparatus 10 from a processing unit 40. In another preferred embodiment the data acquisition is carried out in the DAQ system 13 using the DAQ computer, which may be a processing unit 40. In yet another embodiment the data acquisition is carried out in the DAQ system 13 of which one part is a DAQ computer.

The DAQ system 13 is depicted in FIG. 1 as the surface part of the DAQ system 13 and the detector part of the DAQ system 13. Hence the whole data acquisition setup can be a decentralised one as each muon detection apparatus 10 may be equipped with its own detector part of the DAQ system 13 that communicates directly with the surface part of the DAQ system 13.

In one preferred embodiment the DAQ system 13 is decentralised by distributing the DAQ system 13 partially on the surface (surface part of the DAQ system 13) and partially in the muon detection apparatus 10 (detector part of the DAQ system 13).

In another preferred embodiment the DAQ system 13 is placed solely in the muon detection apparatus 10. In this case, communication between the detector part of the DAQ system 13 of the muon detection apparatus 10 and the set of connected advantageous auxiliaries takes place directly via a detector connecting cable 28'.

In yet another preferred embodiment the DAQ system 13 is placed solely in the muon detection apparatus 10, but there is no detector connecting cable 28'. In this case, the DAQ system 13 in the muon detection apparatus 10 communicates with the surface after it is transported back to the surface. Operational commands 22 and operational parameters 23 are entered into the DAQ system 13 in the muon detection apparatus 10 by using a processing unit 40 before the DAQ system 13 in the muon detection apparatus 10 is disconnected from the processing unit 40. The operational parameters 23 can be read from a configuration file or, in some limited cases the operational parameters 23 can be hard coded directly into the source code of DAQ software. In this case a DAQ computer and its DAQ software are in the detector part of the DAQ system 13 in the muon detection apparatus 10.

Some examples of operational commands 22 are codes that effectively mean commands such as "Start-up", "Start measurement", "Stop measurement", "Reposition muon detection apparatus" and "Shutdown". The operational command "Startup" includes, for example, adjusting the operational parameters 23. After the surface part of the DAQ system 13 has obtained its operational commands 22 and operational parameters 23, these commands and parameters are further communicated by the surface part of the DAQ system 13 to each detector part of the DAQ system 13.

One example of an operational parameter 23 is the threshold that the signal of muon-induced photons in the scintillation detector part 12 must overcome to be counted. Those signals not overcoming the threshold are considered as background and are simply rejected by the detector part of the DAQ system 13. This is called the hardware part of the background reduction and it is carried out in order to reduce the recorded background. In the software part the background reduction is a part of the data analysis.

Another operational parameter 23 is the trigger condition (another prerequisite for data recording), which sets requirements for events (i.e., all simultaneously recorded photon signals resulting from the passing of detected muons) to be recorded. One trigger condition is a coincidence of two independent photon signals in two autonomous, optically separated scintillation bars 11. Another trigger condition is a coincidence of three or more independent photon signals between pluralities of autonomous, optically separated scintillation bars 11. Once the trigger condition is surpassed the muon measurement data are recorded.

Other operational parameters 23 include output file names, buffer sizes, file lengths, baud rates and communication port address with communication protocols and communication standards that are, for example, CANopen and RS-485 with Modbus. Operational parameters 23 are distributed individually for each muon detection apparatus 10.

Yet another operational parameter 23 is the sample rate that defines, for example, the frequency the temperature, pressure, humidity and position information are read.

Operational variables 31 are numeric or textual variables that carry valuable information concerning the internal conditions of each muon detection apparatus 10, or some other parts or components of the muon detection system 100. Operational variables 31 are recorded and copied to a processing unit 40 during or after the muon detection. Operational variables 31 comprise at least one internal measurement of the muon detection apparatus 10 selected from temperature, pressure and humidity. The other internal operational variables 31 may be recorded as well, including error messages that assist to isolate the source of erroneous operation. As an example, "ERROR [id. number]: no connection to the server!" indicates an error while connecting to a server 49.

The values of operational variables 31 indicate effectively whether or not the operational variables 31 are within the acceptable, pre-set value ranges whilst the muon detection apparatus 10 detects muons. If any operational variable 31 measures values outside its acceptable range, the given information may be used for estimating the reason for false operation and subsequent correcting measures can be considered. For example, high pressure and humidity indicate a leak in the muon detection apparatus 10, while high temperature may indicate a short circuit in the muon detection apparatus 10. The required corrective actions such as new operational commands 22 and operational parameters 23 may be implemented either automatically by applying a computer program or manually by an administrator using a processing unit 40 and the like. The decision point for the corrective actions can take place in any operational part or functional element of the muon detection system 100.

In one preferred embodiment the current states of operational variables 31 can be monitored automatically. If the value of any operational variable 31 has deviated from its pre-set range, the muon detection system 100 is alarmed and subsequent correcting measures are carried out.

In another preferred embodiment the detector part of the DAQ system 13 is advantageously configured to send the operational variables 31 of the muon detection apparatus 10. The detector part of the DAQ system 13 sends the operational variables 31 to the DAQ computer of the surface part of the DAQ system 13, which further communicates these variables to a processing unit 40 for further analysis.

In the example of FIG. 1 the muon detection system 100 comprises the DAQ system 13 which advantageously also comprises the detector part of the DAQ system 13.

In one preferred embodiment the detector part of the DAQ system 13 is configured to select at least one from: (i) detect photon signals from the given muon detection apparatus 10 (i.e., photon signals overcoming the pre-set threshold value), (ii) require that the pre-set trigger condition is fulfilled, and (iii) send the muon measurement data together with the other recorded data, such as operational variables 31, to further data processing to a processing unit 40.

The detector part of the DAQ system 13 in each muon detection apparatus 10 is configured to send muon measurement data and possible other recorded data from the muon detection apparatus 10 to the surface. Data transfer from the detector part of the DAQ system 13 may be conducted through a first communication device 14 or second communication device 15. Each muon detection apparatus 10 is equipped with at least one first communication device 14 and some or all also with the second communication device 15. The first communication device 14 and the second communication device 15 are configured to transfer data similarly. However, their data transfer-related tasks are different. Typically data transfer is conducted through the first communication device 14 in the muon detection apparatus 10 to the second communication device 15 on the surface. The second communication device 15 on the surface part of the DAQ system 13 is configured to subsequently send the data to a processing unit 40, for example, via a communication hub device 36. Note, however, that data transfer and communication between one or a plurality of muon detection apparatus 10 and the surface part of the DAQ system 13 may be arranged also in some other means.

The muon detection system 100 further comprises the communication hub device 36, configured to transfer data. These data comprise at least one data set selected from a muon recording 20, operational commands 22, operational parameters 23, position and orientation data 25 and operational variables 31 transferred between at least two devices selected from the detector part of the DAQ system 13, the DAQ computer of the surface part of the DAQ system 13 and a processing unit 40. These data may also comprise a status of voltage from a voltage measurement device 72 that monitors voltage levels of an electrical energy storage device 44.

These data may also comprise meteorological measurement data 69 from a weather station 68. The data transfer through the communication hub device 36 may occur in any direction within the muon detection system 100.

The muon detection system 100 further comprises one or a plurality of processing units 40. The processing unit 40 is configured to send operational commands 22 and operational parameters 23 to all connected muon detection apparatus 10 and record at least one muon recording 20 with the relevant position and orientation data 25 of at least one muon detection apparatus 10.

All connected muon detection apparatus 10 may receive individual operational commands 22 and operational parameters 23. Here individuality means that operational commands 22 and operational parameters 23 can be similar or dissimilar from one muon detection apparatus 10 to another. Hence, all operational muon detection apparatus 10 may receive the same operational commands 22 and operational parameters 23, or some connected muon detection apparatus 10 may receive individual operational commands 22 and operational parameters 23 whilst the other operational muon detection apparatus 10 may receive the same operational commands 22 and operational parameters 23. This is an advantage: individual muon detection apparatus 10 in a set of serially interconnected muon detection apparatus 10 may be controlled separately. Hence, while some muon detection apparatus 10 in a set of serially interconnected muon detection apparatus 10 may be used to collect further muon measurement data from a specifically interesting position, some other muon detection apparatus 10 in the same set of serially interconnected muon detection apparatus 10 may simultaneously be used to investigate new or other positions with different sets of operational commands 22 and operational parameters 23. This feature employs more flexibility and autonomous operability to the muon detection system 100 and it may be executed by different means, including but not limited to changing cable lengths between individual muon detection apparatus 10 in the set of serially interconnected muon detection apparatus 10. This can be executed manually, remotely or automatically (for example, by robotic means).

The connection between individual muon detection apparatus 10 in the muon detection system 100 can be either physical or organised by some other means, for example, via a communication network 52 or local connection means 60. The individual muon detection apparatus 10 may be connected by using one or a plurality of detector connecting cables 28' and with or without one or a plurality of peripheral connecting cables 28".

FIG. 1 shows the subsurface measurement volume 19. The volume of the subsurface measurement volume 19 the muons are detected from depends on the number of used muon detection apparatus 10 and their mutual positions in three dimensions (3D). Hence the volume of the subsurface measurement volume 19 depends not only on the availability of underground sites for muon detection (e.g., boreholes and tunnels), but also the number of single-point muon measurement positions. For clarity FIG. 1 shows the whole volume below the ground surface 18 as a subsurface measurement volume 19. Each muon detection apparatus 10 has its own theoretical "field of view", but in practice a muon detection apparatus 10 may detect only those muons that pass through the material in its field of view and finally succeed to reach the said muon detection apparatus 10. Therefore, the detected muon distribution depends not only on the number of used muon detection apparatus 10 but also on the muon stopping powers of materials (e.g., different rock types with potentially different densities). While muons pass though the material they lose energy according to the stopping power of that said material. This process results in losses in the number of muons detected from different directions through the field of view, i.e., many muons are stopped (and decay) before their muon trajectories 55 would pass them through the muon detection apparatus 10. This favours vertical muons, as the more horizontal the muons are, the longer distances through the material the muons must pass before being detected in the muon detection apparatus 10. This results in more losses in the number of muons in the substantially horizontal angles of the angular distribution than those of vertical, favouring the vertical part of the detected muon distribution. Therefore the detected muon distribution forms a conical volume in which the number of muons is decreasing as the muon arrival angle turns more and more horizontal. This conical volume of detected muons corresponds to a volume between the surface of the material and the muon detection apparatus 10. The apex of the conical volume of detected muons is towards the muon detection apparatus 10.

Each active muon detection apparatus 10 has its own individual distribution of detected muons, or, to be more descriptive, a conical volume of detected muons (i.e., the volume of the subsurface measurement volume 19). For clarity these conical volumes of detected muons are not illustrated as a separate volume from the overall subsurface measurement volume 19 (instead, FIG. 1 shows the whole volume below the ground surface 18 as a subsurface measurement volume 19). The deeper the muon detection apparatus 10 is placed the larger is the conical volume of the detected muons. If there is a plurality of muon detection apparatus 10 in operation, the subsurface measurement volume 19 is comprised of combined conical volumes of detected muons of each individual muon detection apparatus 10. Furthermore, these combined conical volumes of detected muons may be used in order to extract, for example, 3D density distribution maps.

FIG. 1 shows numerous density variations 21 in the subsurface measurement volume 19. In reality such density variations constitute of, for example, rocks having densities dissimilar to surrounding rocks. In geology, density variations are often called "density anomalies". A density anomaly, or a density variation, can be either negative or positive, i.e., the rocks comprising a density anomaly can be either of lower or higher density than the surrounding rocks. The density anomalies can appear in all sizes and shapes, and those can be made of any rock type or any mixture of such. Some density anomalies are irregular or planar, while many are drop-like in shape. A density anomaly can be a geological structure, a rock formation (e.g., a certain sedimentary rock bed), a cavern (e.g., a karst cave or a forgotten mine tunnel) or an ore deposit. For example, many hydrothermal ore deposits are associated with a network of planar geological structures that are known as "faults" or "shear zones", whereas many magmatic intrusion-related ore deposits are associated with relatively large plate-like or drop-like rock bodies. If there are notable density variations in any of these example cases, the density variations often have obtained similar shape(s) than their host structure.

The invention may be used to detect many types of density variations, or density anomalies 21, and it may be applied in all kinds of geological systems. For clarity, a density anomaly does not appear by an attempt to locate it. Instead density anomalies exist regardless of the muon detection. If there are boreholes 88 available in the area of interest, they provide many possibilities to probe density variations 21 in the subsurface measurement volume 19. However, if there are no boreholes 88 available, one can take advantages of, e.g., lakes, wells, caves, tunnels or underground mines.

The invention may also be used to detect density variations in other materials than rocks. These materials include, for example, soil layers, ice and concrete.

The processing unit 40 is configured to extract material densities from at least one position in the subsurface measurement volume 19, i.e., from at least one conical volume of detected muons. The material densities are extracted utilising at least one muon recording 20. The processing unit 40 is further configured to merge extracted material densities from at least one position in the subsurface measurement volume 19 into a density distribution diagram or density distribution map.

If the muon recording 20 and position and orientation data 25 are received only from one muon detection apparatus 10 and that muon detection apparatus 10 is stationary during the muon detection, the result from the merging of extracted densities is a 1.5D time-sequential density diagram or a 2D density distribution map from the subsurface measurement volume 19. However, if the muon recording 20 and related position and orientation data 25 are received from a plurality of positions in the subsurface measurement volume 19 along one or a plurality of boreholes in the same muon detection campaign site, it is possible to obtain a 3D density distribution map from the merging of extracted material densities.

The time-sequential density distribution maps are potentially useful for monitoring of temporal processes that may take place relatively slowly, such as seawater intrusion to groundwater aquifers or water level changes in a cave or tunnel. The time-sequential density distribution maps are also useful in studying seasonal density changes, like groundwater flow, or monitoring density changes occurring in natural or man-made material heaps due to natural environmental changes, industrial activity or erosion. The time-sequential density distribution maps may also be used in many types of climate change studies, like studies of melting glaciers or thawing permafrost.

In one preferred embodiment a set of muon recordings 20 are processed into time-sequential density distribution maps. Each time-sequential density distribution map represents a different time period. The time-sequential density distribution maps may be presented collectively, for example, as a time-lapse video or simply as a set of time-stamped 2.5D or 3.5D maps. The time-sequential density distribution maps are used to study processes that are possibly time-dependent or in places where material densities are known to alter over time.

In another preferred embodiment the time-sequential density distribution maps are compiled by continuous muon detection, i.e., the muon detection system 100 operates continuously to perform long-term stationary muon detection. This method allows detecting very slow changes and possibly periodic changes. In the latter case, slowly progressing periodic changes can be identified only by long muon detection campaigns.

In another preferred embodiment the time-sequential density distribution maps are compiled by following a muon detection mode wherein the muon detection system 100 is stationary, but is activated only occasionally. In this case, the muon detection takes place at random or by following a scheduled survey plan. This method can minimise the energy consumption and the maintenance needs that are either very small or no maintenance is needed during the operation.

In yet another preferred embodiment the time-sequential density distribution maps are compiled by transporting the muon detection system 100 to the muon detection campaign site at random or by a scheduled muon detection plan. In the latter case, the muon detection surveys may be conducted, for example, once in every 6 months, once in every 24 months or once in every 60 months. This method allows the muon detection system 100 to be in active service elsewhere while it is not needed at the muon detection campaign site.

In the example of FIG. 1 the muon detection system 100 comprises different possibilities where a processing unit 40 may be located. A local computer 64 may be a processing unit 40 and is connected via local connection means 60 to the DAQ computer of the surface part of the DAQ system 13. The local computer 64 may comprise advantageously a normal PC, portable computer, tablet computer, smartphone, smartwatch and the like.

In one preferred embodiment the local computer 64 is connected via local connection means 60 to a communication hub device 36. In another preferred embodiment the communication hub device 36 comprises a local computer 64. This local computer may be a processing unit 40. In yet another preferred embodiment the local computer 64 comprises a communication hub device 36. This local computer may be a processing unit 40.

In the example of FIG. 1 local connection means 60 between a plurality of individual devices within a set of connected advantageous auxiliaries may advantageously comprise a wireless or wired connection, such as WLAN (wireless local area network) and LAN (local area network; e.g., Ethernet cable). For example, a local computer 64 and communication hub device 36 may be connected either wirelessly or with a cable to a mobile broadband modem that forms a communication network 52 to the outside world (e.g., internet).

In the example of FIG. 1 the muon detection system 100 further comprises at least one server 49, configured to be connected via a communication network 52 to a communication hub device 36 or local computer 64. This server 49 may be a processing unit 40.

A communication network 52 may be wired or wireless telecommunication network. As illustrated in FIG. 1, the communication network 52 may also be linked via a communication satellite 53. Moreover, FIG. 1 also shows an Earth observation satellite 54. The Earth observation satellites 54 may provide various types of telemetry for the muon detection system 100. Examples of Earth observation satellites 54 include meteorological satellites and other remote sensing satellites. The meteorological satellites provide regional or local weather conditions. The other remote sensing satellites provide remote sensing data which include, for example, elevation data and remote sensing geophysical data acquired via detection of the Earth's surface. The different types of Earth observation satellites 54 include, for example, LiDAR (Light Detection And Arranging) and SAR (Synthetic Aperture Radar) satellites. The LiDAR satellites use laser light to examine the surface of the Earth, while the SAR satellites operate by the microwave radiation enabling acquisition of satellite imagery even through clouds. Some Earth observation satellites 54 acquire data with great accuracy (e.g., one centimetre accuracy at metre and sub-metre scales).

In one preferred embodiment the muon recordings 20 are corrected taking into account the relief of the ground surface 18 of the muon detection campaign site. Such corrections are sometimes called "terrain corrections" and take into account the exact form of the terrain and subtract the influence of the local relief to the muon recordings 20. The thickness and density of all objects resting on the ground surface 18 may also be taken into account while correcting the muon measurement data for the terrain. The terrain correction is executed by correcting the muon recordings 20 by applying, for example, a digital surface model (DSM), digital terrain model (DTM) or digital elevation model (DEM). While the DSM data represent the Earth's surface and includes all objects on it, the DTM data represent only the bare ground surface 18 without objects on it. The term DEM is often used as a generic term that represents solely height information without characterising the relief.

In another preferred embodiment the data used for the terrain correction are, for example, terrestrial, airborne or satellite LiDAR data and the like. The airborne LiDAR data can be acquired together with an airborne geophysical survey 90 or separately with a small aircraft 91 such as an airplane, a helicopter or drone.

It is obvious to someone skilled in the art that the controls of a processing unit 40 may also be implemented as a so-called cloud service or cloud computing. In such an embodiment an administrator or a user does not necessarily need to know that he or she is using a spread-out service, because the user experience corresponds to the view of a locally functioning system. The user sees the interface, just as in the embodiment where the muon detection system 100 is implemented in a local computer 64 or server 49.

In one preferred embodiment the muon detection system 100 further comprises a remote computer 56, configured to be connected to at least one server 49 via a communication network 52 or local connection means 60. This remote computer 56 may be a processing unit 40.

In another preferred embodiment the muon detection system 100 further comprises a remote computer 56 that is configured to be directly connected to the communication hub device 36.

In the method for investigating material densities according to the invention a processing unit 40 is selected from a local computer 64, cloud computing, server 49 and remote computer 56.

In the example of FIG. 1 the muon detection system 100 further comprises an electrical energy storage device 44, configured to deliver electricity to the muon detection system 100. In the example of FIG. 1 electricity is advantageously delivered via a peripheral connecting cable 28" and detector connecting cable 28'.

In one preferred embodiment electricity is delivered to at least one device selected from a muon detection apparatus 10, DAQ system 13, communication hub device 36 and local computer 64.

In another preferred embodiment an electrical energy storage device 44 is configured to deliver to electricity to at least one device selected from a muon detection apparatus 10, DAQ system 13, communication hub device 36, local computer 64 and weather station 68. The electrical energy storage device 44 may deliver electricity also to other connected advantageous auxiliaries than those of the muon detection apparatus 10, DAQ system 13, communication hub device 36, local computer 64 and weather station 68, including a whole set of connected advantageous auxiliaries connected to the electrical energy storage device 44.

In another preferred embodiment an electrical energy storage device 44 further comprises a voltage measurement device 72, configured to measure a status of voltage of an electrical energy storage device 44. Information regarding the status of voltage of the electrical energy storage device 44 at a given moment provides information for an administrator what subsequent operations can be considered or which operational corrective actions are required.

In yet another preferred embodiment a voltage measurement device 72 is further configured to provide a status of voltage of an electrical energy storage device 44 to a processing unit 40. The status of voltage of the electrical energy storage device 44 may be read by a dedicated computer program. This may be performed parallel and independent on the muon detection.

In the example of FIG. 1 an electrical energy storage device 44 is advantageously configured to be connected to an electrical grid 50. The electrical energy storage device 44 is advantageously configured to be recharged by at least one energy source selected from a solar panel 45, windmill 46, hydroelectric power generator 47, aggregate 48 or other available renewable energy source. Therefore, the muon detection campaign utilising the muon detection system 100 can advantageously be actualised outside of power-distribution networks.

In the example of FIG. 1 the muon detection system 100 further comprises a weather station 68 configured to produce meteorological measurement data 69 from the region of the muon detection system 100.

Meteorological measurement data 69 may be used to review and control the muon measurement data. Thus the meteorological measurement data 69 are included in the QA/QC protocol. However, the meteorological measurement data 69 are not obligatory to the correct operation of the muon detection system 100, but are nonetheless very useful for an administrator by increasing understanding of the muon detection system 100. The meteorological measurement data 69 are also useful for assisting an administrator to monitor the muon detection system 100 while operating one or a plurality of muon detection apparatus 10. For example, the meteorological measurement data 69 may be valuable if any parameters recorded by the muon detection apparatus 10 drift from the expected or pre-set values, such drifting indicating erroneous, unstable or slowly deteriorating operation.

In one preferred embodiment meteorological measurement data 69 are combined with the muon recording 20 by using a processing unit 40.

In another preferred embodiment meteorological measurement data 69 comprise at least one measurement selected from temperature, wind direction, wind speed, gust speed, atmospheric pressure, relative humidity, cloud amount, snow depth, sunshine duration, ultraviolet irradiance measurement and air quality observations.

In another preferred embodiment meteorological measurement data 69 from a weather station 68 is read and recorded by a dedicated computer program. This may be performed parallel to and independent of the muon detection.

Meteorological measurement data 69 may advantageously also be fetched from a regional or local weather service on the internet and intranet.

In one preferred embodiment a processing unit 40 may fetch meteorological measurement data 69 from a weather service on the internet or intranet via a communication network 52, local connection means 60 and the like.

As regards to muon counting rates, changes in the atmospheric pressure and temperature have a minor effect on the measured muon counting rates on the ground surface 18. The correction coefficients concerning the atmospheric pressure and atmospheric temperature in the measured muon counting rate can be taken into account if needed. However, in most cases the corrections are within the statistical errors of the measuring system 100 and are the smaller the deeper the muons are detected. Therefore, the possible variations in the atmospheric pressure and temperature do not affect the quality and statistical accuracy of muon measurement data and if they do, this minor effect is well understood and beyond statistical errors only in the uppermost few metres of soil or rock. Furthermore, if atmospheric pressure is approximately constant the muon counting rate is also approximately constant within the same period of time providing thus an efficient tool for QA/QC.

In one preferred embodiment a weather station 68 is connected to a processing unit 40 via a peripheral connecting cable 28″, local connection means 60 or communication network 52. The processing unit 40 advantageously receives meteorological measurement data 69 from the weather station 68. In another preferred embodiment a processing unit 40 is further configured to combine meteorological measurement data 69 with muon recordings 20.

The various auxiliaries in a set of connected advantageous auxiliaries may be decentralised or housed inside a casing or a container that protects the said auxiliaries from the weather and mischief.

Figure 2A:
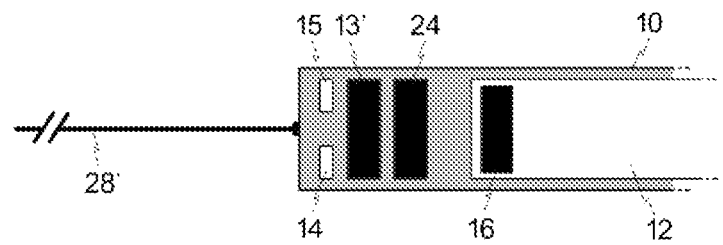
FIGS. 2*a*-*d* shows some functional elements of an exemplary muon detection apparatus 10.
Figure 2B:
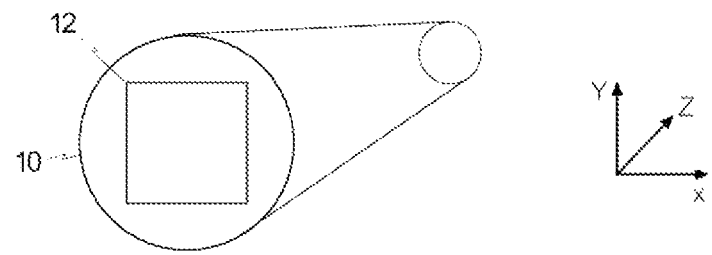
Figure 2C:
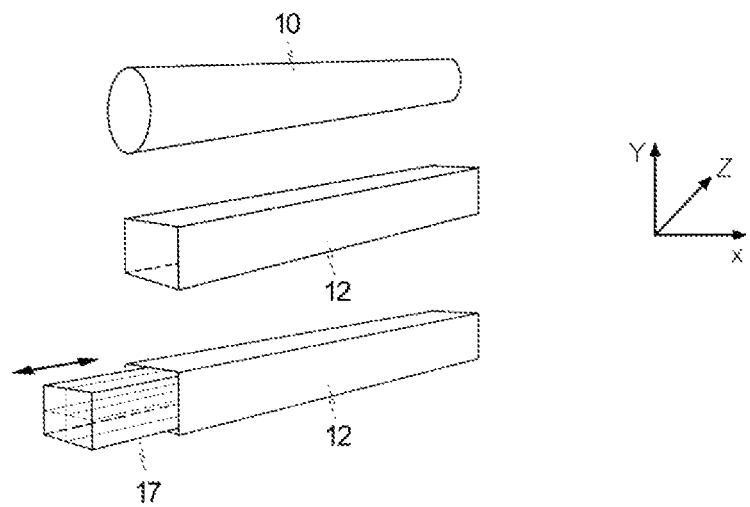
Figure 2D:
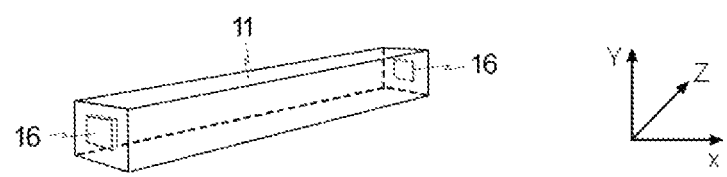

FIGS. 2*a-d* show some functional elements of the muon detection apparatus 10. FIGS. 2*b-c* show a cross-sectional view from the elongated capsule enclosed within a cylindrical detector body of the muon detection apparatus 10 and the nested scintillation detector part 12. FIG. 2*c* illustrates also a matrix framework 17, which is an optional part characterising some particular embodiments. The matrix framework 17 may be nested within the scintillation detector part 12. FIG. 2*d* shows a single scintillation bar 11, i.e., one typical item of the scintillation detector part 12. In the given example the scintillation bar 11 is equipped with two matrix detectors 16, one in both ends. However, someone skilled in the art will appreciate that the scintillation bar 11 can be equipped with one or a plurality of matrix detectors 16. Note that items 13 (detector part of the DAQ system), 24 (position and orientation apparatus) and 28′ (detector connecting cable) in FIG. 2 are already explained in the description of FIG. 1.

In one preferred embodiment each muon detection apparatus 10 comprises a first communication device 14, as shown in FIG. 2*a*. The first communication device 14 is configured to transfer data, such as muon recordings 20, operational commands 22, operational parameters 23, position and orientation data 25 and operational variables 31. A typical data transfer operation is to transfer data between the detector part of the DAQ system 13 and the DAQ computer of the surface part of the DAQ system 13 via the first communication device 14 of the muon detection apparatus 10 and the second communication device 15 of the surface part of the DAQ system 13. The first communication device 14 is configured to transfer data to both directions between the detector part of the DAQ system 13 and the surface part of the DAQ system 13.

In another preferred embodiment at least one muon detection apparatus 10 of the muon detection system 100 or at least muon detection apparatus 10 in a set of serially interconnected muon detection apparatus 10 comprises a second communication device 15, as shown in FIG. 2*a*. This second communication device 15 is configured to collect muon recordings 20, position and orientation data 25 and operational variables 31 from the serially interconnected muon detection apparatus 10. The second communication device 15 is further configured to transfer data similar to the first communication device 14.

On the basis of coincidence requirements, it is obvious that the scintillation bars 11 must not randomly communicate with each other. In other words, the scintillation bars 11 must be optically separated. Here "optically separated" refers to structural design in which each scintillation bar 11 is individually separated from its counterparts. This can be carried out by wrapping each scintillation bar 11 into optically isolating material, like a non-transparent foil or similar. This can also be realised by using paint or other technique or material, or a combination of different techniques or materials, as long as the used technique(s) effectively segregates each scintillation bar 11 from its counterparts. The same can also be achieved by simply mounting scintillation material in an optically isolating matrix framework 17, as shown in FIG. 2c. An optical separation is important because the photons emitted in the various scintillation bars 11 must be prevented to be detected in other than the very same scintillation bar 11 the photons are produced in. If the photons emitted within one scintillation bar 11 are detected in another scintillation bar 11, the photon signal must be considered as background because those particular photons detected in the other scintillation bar 11 are evidently not produced by the muon that pass through that said other scintillation bar 11.

In one preferred embodiment the scintillation detector part 12 consists of a single scintillation bar 11. In another preferred embodiment the scintillation detector part 12 consists of a plurality of scintillation bars 11.

In another preferred embodiment the scintillation bars 11 are wrapped into a photon-reflecting material, painted with photon-reflecting paint, or coated with a thin-film evaporation technique that forms a thin photon-reflecting coating over each scintillation bar 11.

In another preferred embodiment the scintillation bars 11 are encased with a photon-reflecting material or a combination of painting, wrapping, thin-film evaporation and the like.

In yet another preferred embodiment the scintillation detector part 12 consists of scintillation bars 11 encased in an optically isolating matrix framework 17 made of metal or other material that effectively isolates photons within a single scintillation bar 11.

Scintillation materials can be liquid or solid. A scintillation bar 11 can have many types of geometries and cross-sections and it can be composed of solid or liquid scintillation materials, or an assortment of solid or liquid scintillation materials. Solid scintillation materials are typically transparent plastics or inorganic crystals.

In one preferred embodiment the scintillation detector part 12 consists of an optically isolating matrix framework 17 made of metal or other material that effectively isolates photons within one or a plurality of compartments. Each compartment may be filled by solid or liquid scintillation material or inorganic scintillation crystal and may be equipped with one or a plurality of matrix detectors 16. FIG. 2c illustrates a matrix framework 17 nested within the scintillation detector part 12. Note that the illustrated geometry of a square divided into four equal compartments is one example of many possible geometries for the matrix framework 17.

In another preferred embodiment the muon detection apparatus 10 constitutes of a scintillation detector part 12 that is position-sensitive. The position-sensitivity is implemented by constructing the scintillation detector part 12 by using a plurality of individual scintillation elements (i.e., scintillation bars 11).

In another preferred embodiment the muon detection apparatus 10 constitutes of a scintillation detector part 12 that is position-sensitive. The position-sensitivity is implemented by arranging individual scintillation elements of the scintillation detector part 12 in an arrangement that shows symmetry in the cross-section or in the longitudinal axis. Symmetry may be achieved with numerous ways, including arranging the individual scintillation elements by following reflectional symmetry (bilateral symmetry, mirror symmetry) and rotational symmetry (radial symmetry).

In another preferred embodiment the muon detection apparatus 10 constitutes of a scintillation detector part 12 that is position-sensitive. The position-sensitivity is implemented by arranging individual scintillation elements of the scintillation detector part 12 so that the total length of the scintillation detector part 12 is subdivided longitudinally into a plurality of individual compartments that may be of equal size. The scintillation detector part 12 may be filled with liquid or plastic scintillation material or the scintillation detector part 12 may constitute a plurality of individual scintillation bars 11 filled with liquid or plastic scintillation material. Each of such compartments may also be equipped with optical fibres and matrix detectors 16 of different types.

In another preferred embodiment the scintillation detector part 12 comprises one or a plurality of optically separated scintillation bars 11 filled by liquid, plastic or crystallic scintillation material, which scintillation bar 11 is equipped with at least one matrix detector 16 each. FIG. 2d illustrates an example of scintillation bar 11, which is equipped with two matrix detectors 16.

The muon detection apparatus 10 may be manufactured to fit most standard diameter boreholes. However, it is designed to fit especially boreholes 88 that are relatively small in diameter (e.g., 76.3 mm or less). Therefore the muon detection apparatus 10 fits not only standard-size boreholes 88 used in industries such as oil and gas, mineral exploration, technical drilling and civil engineering. The larger the diameter of the muon detection apparatus 10 the larger is the volume of the scintillation material that fits in the scintillation detector part 12. Subsequently, the larger the volume of the scintillation material the larger is the number of muons the muon detection apparatus 10 can detect within a given period of time. However, the diameter of the muon detection apparatus 10 must always be at least slightly smaller (for example, some millimetres) than that of the borehole 88 it is used in. This is important to prevent the muon detection apparatus 10 from getting stuck.

In one preferred embodiment the muon detection apparatus 10 is configured to maximise the volume of the scintillation material in the scintillation detector apparatus 10 positioned in a borehole 88. This may be carried out by optimising the diameter of the muon detection apparatus 10 in order to prevent the muon detection apparatus 10 to get stuck in the borehole 88.

Figure 3:
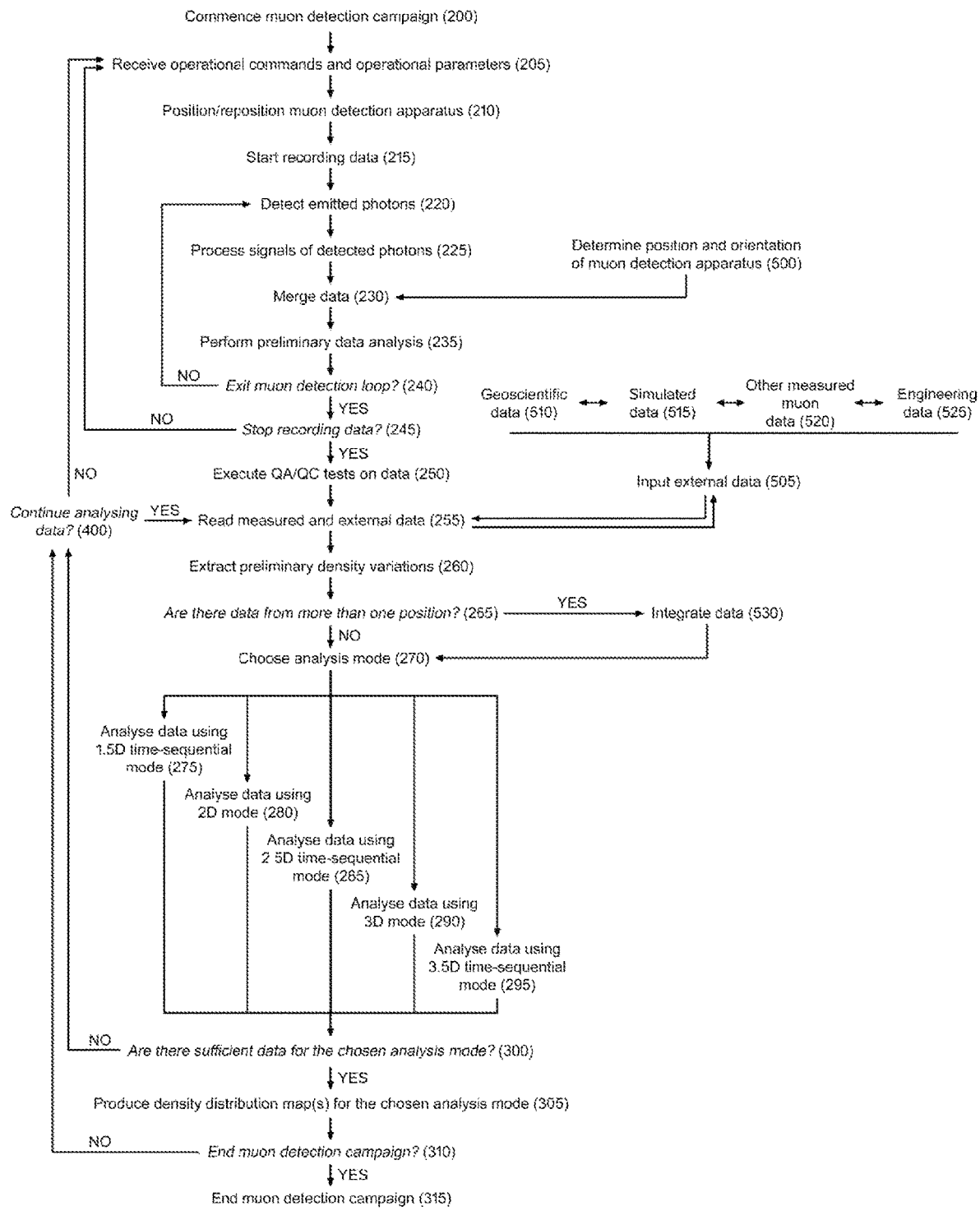
FIG. 3 shows in an exemplary flow chart the main steps of an exemplary method according to the invention.

FIG. 3 shows an exemplary flow chart that depicts the operational principles the muon detection system 100 is based on. The operational principles of the muon detection system 100 are shown in FIG. 3 as a series of method steps, but one nonetheless notes that the shown exemplary flow chart is just one example of the many possibilities regarding the operation of the muon detection system 100. Most of these method steps can be executed remotely by using a processing unit 40. Steps that are executed remotely can be executed either manually by an administrator (or an authorised user) or automatically by a computer program executing a series of programmed steps. Some steps in the presented exemplary flow chart are optional, while others are required in some form in all scenarios. Moreover, some steps may be changed or modified depending upon the information received while the steps are executed.

In the depicted exemplary flow chart of FIG. 3 and the corresponding description the actual processing of muon measurement data is accomplished in a processing unit 40 that may also be a server 49. However, the inventive method is not limited to the embodiment of FIG. 3. Further, it is possible to use different connected computers or their combinations to execute different method steps. It is also possible to use different computer program products as a tool to process the muon measurement data.

In one embodiment of the invention the depicted method steps of FIG. 3 may be executed using a server 49, local computer 64, remote computer 56 or cloud computing.

The muon detection campaign can be divided into the data recording part (steps 205-245 and step 500) and data validation, analysis and interpretation part (steps 250-315, step 400 and steps 505-530). While in the data recording part nearly all steps are obligatory, the data validation, analysis and interpretation part provides more degrees of freedom depending on details concerning the data analysis and visualisation. The data recording part is conducted on the muon detection campaign site, while the data validation, analysis and interpretation part usually takes place at the office or similar. Most steps are usually conducted by using computer commands. Most of the steps in the data recording part are executed in the DAQ computer of the surface part of the DAQ system 13. The operational commands 22 may be delivered by using a processing unit 40. In the data validation, analysis and interpretation part most of the steps are executed using a processing unit 40.

A muon detection campaign continues until step 315 ("End muon detection campaign") is executed. This effectively means that one may reposition the muon detection apparatus 10 or a plurality of interconnected muon detection apparatus 10 to other boreholes 88 as many times as required until the muon survey detection campaign plan requirements are fulfilled. The muon detection campaign can be conducted, for example, with steps described below.

In step 200, "Commence muon detection campaign", the muon detection system 100 is switched on. This switching on can be carried out manually by an administrator and includes switching on power to all of its necessary parts. Step 200 includes starting the DAQ computer to its full operational capacity, but may also include many more operations such as verifying the connection between the DAQ computer and a processing unit 40. Before the muon detection system 100 is activated as described above, it may remain in a standby mode.

In one preferred embodiment step 200 ("Commence muon detection campaign") is executed manually (remotely) by applying a remote processing unit 40. In another preferred embodiment step 200 is executed automatically by applying a computer program, timer and the like. In another preferred embodiment step 200 contains steps such as logging in a local computer 64, remote computer 56, server 49 and the like. In yet another preferred embodiment step 200 contains setting up the connection between the surface part of the DAQ system 13 and the detector part of the DAQ system 13 via a detector connection cable 28'.

In step 205, "Receive operational commands and operational parameters", the detector part of the DAQ system 13 in a muon detection apparatus 10, or in a plurality of muon detection apparatus 10, receives the operational commands 22 and operational parameters 23 that are needed during the muon detection. This step may include loading of updated operational commands 22 and operational parameters 23 by applying a processing unit 40. This step may also include, for example, changes in the dates of the file names or changes in the thresholds.

In optional step 210, "Position/reposition muon detection apparatus", the muon detection apparatus 10, or a plurality of muon detection apparatus 10, is positioned or repositioned manually or according to the operational parameter 23 send to the automatised positioning device 29. The operational parameter 23 sets the position of the muon detection apparatus 10, or a plurality of muon detection apparatus 10, remotely or automatically by applying a computer program, timer and the like. The positioning is based on the most up-to-date version of the muon detection campaign plan, which may evolve during the muon detection campaign plan. The muon detection campaign plan may also change depending on the results of the preliminary data analysis of step 235 ("Perform preliminary data analysis").

In one preferred embodiment of the muon detection system 100 one or a plurality of muon detection apparatus 10 is positioned manually by using a detector connecting cable 28'. This can be carried out, for example, by employing a winch or a simple pulley. In another preferred embodiment of the muon detection system 100 one or a plurality of muon detection apparatus 10 is positioned remotely according to the operational parameter 23 by applying a remote processing unit 40. In yet another preferred embodiment of the muon detection system 100 one or a plurality of muon detection apparatus 10 is positioned automatically according to the operational parameter 23 by applying a computer program, timer and the like.

In step 215, "Start recording data", a computer program controlling the DAQ system 13 is launched. This computer program or a set of computer programs is called DAQ software and it is in the DAQ computer and commands the whole DAQ system 13 (and hence both the surface part of the DAQ system 13 and the detector part of the DAQ system 13).

In practise, the steps from step 205 to step 215 as shown in FIG. 3 take place within a short period of time or simultaneously within the surface part of the DAQ system 13 and in all operating detector parts of the DAQ system 13 in all the operating muon detection apparatus 10. Instead, step 220 ("Detect emitted photons") is continuously carried out in the detector part of the DAQ system 13. Step 220 ("Detect emitted photons") continues while the muon detection is running until step 240 ("Exit muon detection loop?") ends the muon detection.

In step 220, "Detect emitted photons", each muon detection apparatus 10 detects emitted photons in its scintillation detector part 12 as photon signals according to the operational commands 22 and operational parameters 23 delivered in step 205 ("Receive operational commands and operational parameters") by a processing unit 40. Steps 220 ("Detect emitted photons"), 225 ("Process signals of detected photons") and 230 ("Merge data") and step 500 ("Determine position and orientation of muon detection apparatus") form the muon detection loop that is repeated until step 240 ("Exit the muon detection loop?") exits the loop. Exit is executed locally, remotely or automatically. Optional step 235 ("Perform preliminary data analysis") can be executed at any time and also outside the muon detection loop, even after step 240 ("Exit the muon detection loop?").

In step 225, "Process signals of detected photons", the detected photons from each muon detection apparatus 10 are processed into a form of the muon recording 20 in different parts of the DAQ system 13. If the data acquisition is not stopped the emitted photons in the scintillation detector part 12 are detected in a matrix detector 16 without interruption.

Step 500, "Determine position and orientation of muon detection apparatus", is depicted as an element of the muon detection loop, even though it can be run outside the loop as well. The position and orientation of the muon detection apparatus 10 is determined by using at least one integrated position and orientation apparatus 24. The position and orientation of the muon detection apparatus 10 are recorded as the position and orientation data 25.

In step 230, "Merge data", the muon recording 20 and the corresponding position and orientation data 25 are merged to the form of muon measurement data in the DAQ computer of the surface part of the DAQ system 13. If the data acquisition is not stopped emitted photons are detected without interruption.

In one preferred embodiment the merging of the muon recording 20 and the position and orientation data 25 is conducted in the DAQ system 13 by using DAQ software.

In optional step 235, "Perform preliminary data analysis", the preliminary data analysis is performed in a processing unit 40. The preliminary data analysis is carried out to judge the recorded statistics and the quality of data, and to conclude whether it is the appropriate moment to stop the muon detection in step 240 ("Exit muon detection loop?"). If the data acquisition is not stopped emitted photons are detected without interruption. This step is a part of the QA/QC protocol.

In one preferred embodiment the preliminary data analysis performed in a processing unit 40 extracts the measured muon counting rates in order to study the recorded statistics. The preliminary data analysis is executed by an administrator, computer program or timer.

In another preferred embodiment the preliminary data analysis performed in a processing unit 40 extracts the preliminary muon angular distribution in order to study the recorded statistics. The preliminary data analysis is executed by an administrator, computer program or timer.

In yet another preferred embodiment the preliminary data analysis is performed or assisted using AI (Artificial Intelligence), ML (Machine Learning) algorithms or both in a processing unit 40.

In step 240, "Exit muon detection loop?", the continuation of the muon detection is resolved on the basis of the results of the preliminary data analysis of step 235 ("Perform preliminary data analysis") or according to scheduled duration of the muon detection time, either manually, remotely or automatically. The muon detection loop continues by default, whilst exit requires an administrator or an exit command executed by a computer program or timer.

In one preferred embodiment the muon detection is stopped locally at the muon detection campaign site, for example, by using a local processing unit 40 of the DAQ computer or a local processing unit 40 of the local computer 64. If these processing resources are not available, the exit from the muon detection can be carried out manually by simply switching off the power.

In another preferred embodiment the muon detection is stopped remotely by applying the remote processing unit 40 or automatically by applying a computer program, timer and the like.

In step 245, "Stop recording data?", the continuation of recording the muon recording 20 and position and orientation data 25 is resolved either manually, remotely or automatically. The decision is based on the muon detection campaign plan, which may evolve during the muon detection. The decision may also be based on the preliminary data analysis of step 235 ("Perform preliminary data analysis"). If the goal(s) of the muon detection campaign has not yet been reach sufficiently, the data recording part of the campaign step 205 ("Receive operational commands and operational parameters"). However, if the goal(s) of the muon detection campaign has been reached sufficiently, the campaign can be stopped and the next step is step 250 ("Execute QA/QC tests on data").

In one preferred embodiment the continuation of the muon detection campaign is decided locally at the muon detection campaign site. In another preferred embodiment the continuation of the muon detection campaign is resolved remotely by applying a remote processing unit 40 or automatically by applying software, timer and the like. In yet another preferred embodiment the continuation of the muon detection campaign is resolved by AI (Artificial Intelligence), ML (Machine Learning) algorithms or both.

In step 250, "Execute QA/QC tests on data", the recorded measured data are processed in a processing unit 40. The processing herein advances to greater details than the simple preliminary data analysis conducted in step 235 ("Perform preliminary data analysis"). The processing may include, for example, arranging the muon measurement data according to the position and depth. Another task is to verify that the muon measurement data are measured according to the muon detection campaign plan and that the muon measurement data do not contain unwanted spatial gaps in the subsurface measurement volume 19. Other tasks are statistical analyses and quality checks on the recorded muon measurement data. This step is a part of the QA/QC protocol.

In step 255, "Read measured and external data", the measured data and external data are read. The external data are read in the optional step 505 ("Input external data"). If there are no other data sets available, or other data sets are not needed, the next step is step 260 ("Extract preliminary density variations").

In optional step 505, "Input external data", the external data may be of any type that potentially benefits the current muon detection campaign. The external data may have been produced or acquired at some former stage, or those may be contemporaneous data. The external data may be earlier recorded muon measurement data, such as those recorded during the previous muon detection campaign(s). This step may include collecting and arranging various external data to allow their subsequent comparisons with and against the current muon detection campaign data. These data may be, for example, geological, geochemical and geophysical data of step 510 ("Geoscientific data"), simulated data of step 515 ("Simulated data"), other measured muon data of step 520 ("Other measured muon data") and engineering data of step 525 ("Engineering data"). The two-headed arrows between steps 510-525 illustrate boundless communication, data transfer and comparison between the steps.

In one preferred embodiment the external data are in numerical format (e.g., digital binary data) and can be incorporated to the same computer analysis software as the muon measurement data. In another preferred embodiment the external data are in non-numerical format and may be used to evaluate and verify the analysis of the muon measurement data.

In optional step 510, "Geoscientific data", the geoscientific data may be, for example, geological, geochemical and geophysical in character. Geological data may comprise, for example, drill core logs and geological outcrop observations. Geochemical data, on the other hand, may comprise many types of geochemical data of any type of geological material, including drill core assays. Geophysical data may include many types of airborne geophysical data from the airborne geophysical survey 90 acquired with a small aircraft 91 (e.g., by flying over the study area with an airplane, helicopter or drone). Geophysical data may also include many types of ground geophysical data from the ground geophysical survey 92 and geophysical data acquired by applying many types of geophysical survey techniques in a borehole, for the drill core, or in a tunnel, cavern and the like. The geoscientific data may also be non-numeric, such as literary reports and publications.

In optional step 515, "Simulated data", the external simulated data (for example, simulated muon data and simulated density data) are used to benefit the density data analysis related steps in the later steps. One of such density data analysis steps is step 305 ("Produce density distribution map(s) for the chosen analysis mode"). The external simulated data are beneficial for the muon detection campaign in many different stages of the muon detection campaign and assist to iterate the interpretations and visualisations of the measured muon data towards the most realistic density models.

In optional step 520, "Other measured muon data", the external measured muon data are organised into a form that can be utilised in the present muon detection campaign in step 505 ("Input external data").

In one preferred embodiment the external measured muon data are used for the benefit of the current muon detection campaign. These data include muon data measured peripherally or at the present muon detection campaign site. These data may be recorded earlier or in tandem with the same muon detection system 100, any of its predecessor versions or other type of muon detection system, including a muon telescope and the like.

In optional step 525, "Engineering data", the external engineering data are used in the later density data related analysis steps. One of such density data analysis steps is step 305 ("Produce density distribution map(s) for the chosen analysis mode"). Engineering data may include, for example, geotechnical construction data, civil engineering data, structural engineering data, transport engineering and water engineering data. Examples of worksites that produce engineering data include tunnels, bridges, towers, buildings, roads, railways, airports, dams, mines and groundwater sites and coastal water sites.

In one preferred embodiment the muon detection system 100 may be applied to engineering worksites under construction, during maintenance, during inspection of their current condition or in long-term monitoring.

In optional step 260, "Extract preliminary density variations", the preliminary density variations 21 are numerically extracted if required. The first task is to verify that the muon measurement data processed in step 250 ("Execute QA/QC tests on data") are in the form allowing a comparison with and against other selected data sets, such as all available geoscientific data of step 510 ("Geoscientific data"), simulated data of step 515 ("Simulated data"), other measured muon data of step 520 ("Other measured muon data") and engineering data of step 525 ("Engineering data"). The preliminary density variations 21 may be, for example, numerical variations such as variations from the average densities or reference densities, or alternatively known, measured or estimated absolute densities.

In one preferred embodiment the preliminary density variations 21 are expressed as non-numerical symbols and the like. In another preferred embodiment the preliminary density variations 21 are numerically extracted. These numerical density extractions may be estimated on the basis of the muon measurement data or by comparing the muon measurement data with and against other available data sets that may benefit the current muon detection campaign. In yet another preferred embodiment the preliminary density variations 21 are not required. In such cases simple muon counting rates are measured. One example is monitoring of temporal variations in material densities.

In step 265, "Are there data from more than one position?", the number of positions the muon measurement data and possible other density data are required is solved. These density data may be from a single muon detection apparatus 10, a plurality of muon detection apparatus 10, or density data from the input external data of step 505 ("Input external data"), step 510 ("Geoscientific data"), step 515 ("Simulated data"), step 520 ("Other measured muon data") and step 525 ("Engineering data"). If the data are extracted from a plurality of positions, step 530 ("Integrate data") is executed. Otherwise, the next step is 270 ("Choose analysis mode"). One notes that it is not always necessary to use all available muon measurement data.

In one preferred embodiment the number of positions the data are required is solved by an administrator using a processing unit 40. In another preferred embodiment the number of positions the data are required is solved by an automated computer program or by AI (Artificial Intelligence), ML (Machine Learning) algorithms or both.

In step 530, "Integrate data", all data relevant to the subsurface measurement volume 19 are merged. This includes performing all procedures required before entering the next steps of the data validation, analysis and interpretation part.

In one preferred embodiment the output of merging data is a list of data files to be analysed in the next steps of the data validation, analysis and interpretation part. In another preferred embodiment the output of merging data is a single data file or a plurality of data files. In another preferred embodiment the available density data outside the subsurface measurement volume 19 may be combined to the muon measurement data in order to expand the subsurface measurement volume 19.

In yet another preferred embodiment external discrete density data (e.g., petrophysical density measurements on drill core) available from rocks outside the muon measurement data may be used to produce simulated data by applying algorithms that translate external numeric density values to such simulated data via mathematical translation. The simulated data of step 515 ("Simulated data") may be visualised in step 305 ("Produce density distribution map(s) for the chosen analysis mode") by using the same algorithms as used for the measured muon data. Such a technique may be used to further expand the coverage of the actual muon detection campaign data with the simulated data.

In step 270, "Choose analysis mode", the data analysis mode is selected. The available analysis modes depend on the number of the muon detection apparatus 10 used in the muon detection campaign, but also from the external data of the step 505 ("Input external data") that may include geoscientific data (step 510, "Geoscientific data"), simulated data (step 515, "Simulated data"), other measured muon data (step 520, "Other measured muon data") and engineering data (step 525, "Engineering data"). This data analysis may also include simulations or mathematical extrapolations of the muon measurement data to regions where density data are not readily available.

In one preferred embodiment these analysis modes are 1.5D mode (step 275, "Analyse data using 1.5D time-sequential mode"), 2D mode (step 280, "Analyse data using 2D mode"), 2.5D time-sequential mode (step 285, "Analyse data using 2.5D time-sequential mode"), 3D mode (step 290, "Analyse data using 3D mode") and 3.5D time-sequential mode (step 295, "Analyse data using 3.5D time-sequential mode").

In step 275, "Analyse data using 1.5D time-sequential mode", the time-sequential muon counting rate is extracted as a function of time in a X-Y diagram. This 1.5D density mode is one of the simplest density measurement methods. Time or a period of time is usually plotted in the horizontal axis, while the muon counting rates are presented as periods of equal duration.

In one preferred embodiment the invention provides a method to carry out material density-dependent muon radiography that yields simple density diagrams called muon counting rate diagrams. These diagrams are time-sequential by nature.

In another preferred embodiment data sorting and analysis in step 275 ("Analyse data using 1.5D time-sequential mode") are performed or assisted using AI (Artificial Intelligence), ML (Machine Learning) algorithms or both.

In step 280, "Analyse data using 2D mode", the muon measurement data from one position of a single muon detection apparatus 10 is analysed. In the later steps this analysis mode results in 2D density distribution maps.

In one preferred embodiment the invention provides a method to carry out material density-dependent muon radiography that yields 2D density distribution maps called muon radiographs.

In another preferred embodiment a single muon detection apparatus 10 is applied in a single position. This technique may be used, for example, to investigate the overall volume of the already drill intersected but otherwise poorly known density anomaly or density variation 21 by positioning a single muon detection apparatus 10 to another nearby located borehole 88. In such cases the muon detection apparatus 10 has to be positioned somewhat below the known intersection in the other borehole 88. This technique is useful, for example, to answer whether or not the poorly known density anomaly or density variation 21 warrants further drilling.

In yet another preferred embodiment data sorting and analysis in step 280 ("Analyse data using 2D mode") are performed or assisted using AI (Artificial Intelligence), ML (Machine Learning) algorithms or both.

In step 285, "Analyse data using 2.5D time-sequential mode", the time-sequential 2.5D muon measurement data are analysed. This step is similar to the 1.5D time-sequential analysis technique of step 275 ("Analyse data using 1.5D time-sequential mode"), but instead of a simple muon counting rate that is extracted as a function of time in a 2D X-Y diagram, the angular distribution of muons (i.e., their directions) is also taken into account. In the later steps, this analysis mode results in 2.5D time-sequential density distribution maps that have not only two-dimensionality but also time-sequential information.

In one preferred embodiment the invention provides a method to carry out material density-dependent time-sequential muon radiography that yields 2.5D density distribution maps called time-sequential muon radiographs.

In another preferred embodiment data sorting and analysis in step 285 ("Analyse data using 2.5D time-sequential mode") are performed or assisted using AI (Artificial Intelligence), ML (Machine Learning) algorithms or both.

In step 290, "Analyse data using 3D mode", the analysed muon measurement data originate from a plurality of positions. A minimum requirement is that there exist muon measurement data from two positions. In the later steps, this analysis mode results in 3D density distribution maps.

In one preferred embodiment the invention provides a method to carry out material density-dependent muon tomography that yields 3D density distribution maps called muon tomograms.

In another preferred embodiment the data sorting and analysis in step 290 ("Analyse data using 3D mode") are performed or assisted using AI (Artificial Intelligence), ML (Machine Learning) algorithms or both.

In step 295, "Analyse data using 3.5D time-sequential mode", the time-sequential 3.5D muon measurement data are analysed. This step is similar to the 2.5D time-sequential analysis technique of step 285 ("Analyse data using 2.5D time-sequential mode"), but instead of a two-dimensional angular muon distribution the three-dimensional angular muon distribution is extracted as a function of time in a three-dimensional Cartesian grid (X-Y-Z diagram). The angular distribution of muons (i.e., their directions) is also taken into account. In the later steps, this analysis mode results in 3.5D time-sequential maps that have not only three-dimensionality but also time-sequential information.

In one preferred embodiment the invention provides a method to carry out material density-dependent time-sequential muon tomography that yields 3.5D density distribution maps called time-sequential muon tomograms.

In another preferred embodiment data sorting and analysis in step 295 ("Analyse data using 3.5D time-sequential mode") are performed or assisted using AI (Artificial Intelligence), ML (Machine Learning) algorithms or both.

In step 300, "Are there sufficient data for the chosen analysis mode?", the result(s) of the previous analysis is put into scrutiny. If the data appear to be sufficient to reach the desired outcome, step 305 ("Produce density distribution map(s) for the chosen analysis mode") is executed. Otherwise, the next step is step 400 ("Continue analysing data?").

In step 400, "Continue analysing data?", one decides whether or not to continue data analysis. If the data are not satisfactory for the set goals, one must proceed to step 205 ("Receive operational commands and operational parameters") in order to record more data. If the data are sufficient, step 255 ("Read measured and external data") is executed. This may also include an input of external data (step 505).

In step 305, "Produce density distribution map(s) for the chosen analysis mode", the muon measurement data are used to generate density distribution maps. This step may include interpretations, iterations, validations, verifications, discussions and visualisations. This is the first time the "raw" muon measurement data are translated into visualised density maps. However, visualisation activities may also be performed beyond the present muon detection campaign, for example, by the client or collaboration. Note that the data of 1.5D mode (step 275, "Analyse data using 1.5D time-sequential mode") are not sufficient for producing density distribution maps.

In step 310, "End muon detection campaign?", one decides whether or not to end the muon detection campaign. If the density distribution map(s) generated in step 305 is adequate concerning the original or iterated campaign goal(s), the next step is step 315 ("End muon detection campaign"). However, if this is not the case the campaign continues according to step 400 ("Continue analysing data?").

In step 315, "End muon detection campaign", the muon detection campaign is ended.

The muon measurement data sorting procedures are depending on the given objectives. For example, for the QA/QC purposes simple data sorting is usually sufficient, while those in the data validation, analysis and interpretation stage are more challenging. Sorting may include reviewing the data and its integrity. Sorting may also include such tasks as classifying the muon measurement data according to the recorded files of the muon recordings 20 and subsequently inspecting the data for finding anomalous or erroneous data rows. Sorting the muon measurement data may further include analysis of the data by comparing density maps produced differently. This may include, for example, examining whether the time-sequential 2.5D density distribution maps produced in step 285 ("Analyse data using 2.5D time-sequential mode") are better for solving the given problem (or task) than the 2D density distribution maps produced in step 280 ("Analyse data using 2D mode").

In one preferred embodiment the data are sorted manually by an administrator using a processing unit 40 and the like. In another preferred embodiment the data are sorted by AI (Artificial Intelligence), ML (Machine Learning) algorithms or both.

The analysis of muon measurement data by the 2D analysis mode (step 280, "Analyse data using 2D mode") is generally applied in an early stage of a muon detection campaign when there are not yet muon measurement data available from other positions. This analysis mode is also used in applications where there is no need to apply muon detection in more than one position. The muon measurement data applicable to the 2D analysis mode may be, in some cases, exactly the same muon measurement data than those used in step 275 ("Analyse data using 1.5D time-sequential mode"), or it may be a larger data set.

The analysis of muon measurement data by the 2.5D time-sequential analysis mode (step 285, "Analyse data using 2.5D time-sequential mode") is generally applied in an early stage of the muon detection campaign when there are not yet muon measurement data available from other positions but there are enough data for time-sequential analysis. This analysis mode is also used in applications where there is no need to apply muon detection in more than one position.

The muon measurement data applicable to the 2.5D time-sequential analysis mode (step 285, "Analyse data using 2.5D time-sequential mode") may be, in some cases, exactly the same muon measurement data than those used in step 280 ("Analyse data using 2D mode"), or it can be a larger data set. The time scale of the study must also be sufficient for extracting density changes in time as, for example, a study lasting a week cannot predict a process or recognise a pattern that is simply not recognisable in such a time scale.

The analysis of muon measurement data by the 3D analysis mode (step 290, "Analyse data using 3D mode") is generally applied in an intermediate or later stage of the muon detection campaign when there are already muon measurement data available from a plurality of positions. In this case, the spatial accuracy (also known as spatial resolution) of the muon measurement data is better than it is in 1.5D, 2D and 2.5D muon measurement data sets. Moreover, the spatial accuracy of the 3D muon measurement data is the better the more positions the muon measurement data are extracted from. The muon measurement data recording positions can be distributed along a single borehole 88 or a plurality of boreholes 88. In the latter case the total muon measurement data may be a combination of muon measurement data recorded from a single position per borehole 88, from a plurality of positions in each borehole 88, from a plurality of positions in a single borehole 88 but single positions in the other boreholes 88, or any combination of muon measurement data recording positions.

The analysis of muon measurement data by the 3.5D time-sequential analysis mode (step 295, "Analyse data using 3.5D time-sequential mode") is generally applied in an intermediate or later stage of a muon detection campaign when there are already muon measurement data available from a plurality of positions. The time scale of the study must also be sufficient for extracting density changes in time, since, for example, a study lasting a week cannot predict a process or recognise a pattern that is simply not recognisable in such a time scale. The muon measurement data applicable to the 3.5D analysis mode may be, in some cases, exactly the same muon measurement data than those used in step 290 ("Analyse data using 3D mode"), or it can be a larger data set.

One notes that step 310 ("End muon detection campaign?") may be a long-term process and may include establishing, updating and organising various databases for the following muon detection campaigns and further studies using the recorded muon measurement data. The previous sets of muon measurement data recorded with the muon detection system 100 can be reanalysed even after the muon detection campaign has ended. This may also include applying of new analysis methods, computer program products and visualisation algorithms for the previous sets of muon measurement data.

Following step 315 ("End muon detection campaign") the final data are provided to the client or the collaboration.

Someone skilled in the art will appreciate that the method steps described above are just one possible approach to operate the muon detection system 100 and the invention as a whole. It is also to be understood that in the broadest aspect of the invention many other activities and method steps are possible and in most occasions are, indeed, required. One of such activities is calibrations producing calibration data.

Figure 4:
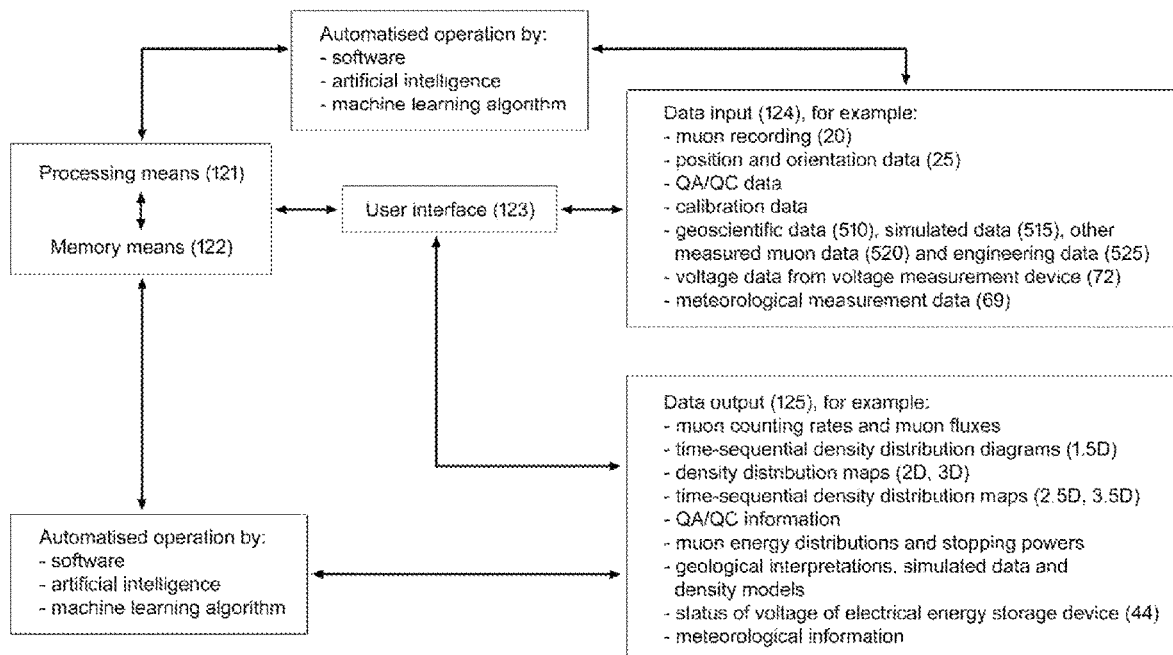
FIG. 4 shows functional elements of a computer or a server utilised in the implementation of a muon detection system 100 according to the invention.

FIG. 4 shows the main functional elements or parts of the local computer 64, server 49 or remote computer 56 utilised as a processing unit 40 in the implementation of the method utilised for investigating material densities or belonging to the muon detection system 100 according to the invention. The local computer 64, server 49 or remote computer 56 comprises a processor or processing means 121, which advantageously comprise an arithmetic logic unit, a number of different registers and control circuits. A data storing arrangement, such as a memory unit or memory means 122, whereon computer-readable information, programs or mechanical structure data can be stored, has been connected to the processing means 121. The memory means 122 typically contain memory units, which allow both reading and writing functions (Random Access Memory, RAM), and memory units containing non-volatile memory, from which data can only be read (Read Only Memory, ROM) or SSD (Solid State Drive) and the like.

The local computer 64, server 49 or remote computer 56 also comprises an input or input means for data input 124 for receiving data from, for example, one or a plurality of muon detection apparatus 10, DAQ system 13, voltage measurement device 72, and weather station 68. An input external data 505 source may also provide data for the data input 124. Data input 124 may include, for example, muon recordings 20, position and orientation data 25, QA/QC data, calibration data, geoscientific data 510, simulated data 515, other measured muon data 520, engineering data 525, voltage data from the voltage measurement device 72 and meteorological measurement data 69. The data received for the data input 124 are advantageously transferred to be processed by the processing means 121 of the local computer 64, server 49 or remote computer 56 via a user interface 123. The input data from data input 124 may also include parameters and data for simulations and visualisations. Processes between processing means 121, memory means 122 and data input 124 may also be advantageously automatised by applying appropriate computer program products, artificial intelligence or machine learning algorithms.

The local computer 64, server 49 or remote computer 56 also comprises an output or output means for data output 125 for producing or modifying data from the data input 124 or local computer 64, server 49 or remote computer 56 via a user interface 123. Data output 125 may include, for example, muon counting rates and muon fluxes, time-sequential density distribution diagrams (1.5D), density distribution maps (2D or 3D), time-sequential density distribution maps (2.5D or 3.5D), QA/QC information, muon energy distributions, stopping powers, geological interpretations, simulated data, density models, status of voltage of electrical energy storage device 44 and meteorological information. Processes between processing means 121, memory means 122 and data output 125 may also be advantageously automatised by applying appropriate computer program products, artificial intelligence or machine learning algorithms.

The user interface 123 that may be applied as a user interface between the user and local computer 64, server 49 or remote computer 56 allows users to interact with the local computer 64, server 49 or remote computer 56 when operating, managing or monitoring the operation of the muon detection system 100. The user interface 123 comprises means for receiving data and/or the operational commands 22, operational parameters 23 and operational variables 31 from an administrator of the muon detection system 100, a computer program or AI (Artificial Intelligence). The user interface 123 may also be used for entering control commands such as "Copy files", "Move files", "Remove files", "Update" and "Upgrade" to the muon detection system 100 as well as for sorting data for the benefit of the data validation, analysis and interpretation by a processing unit 40. The user interface 123 may comprise, for example, a keyboard, touch screen, microphone and speaker. The user interface 123 may be, for example, a command line interface, graphical user interface (GUI) or menu driven interface.

The muon measurement data must be related to a known reference frame. Therefore it is imperative to know the precise geographic location and three-dimensional position of the borehole 88 (if the muon detection system 100 is applied to a borehole 88) so that the location of data associated with the borehole 88 can be determined.

In one preferred embodiment the position and orientation data 25 of the position and orientation apparatus 24 of the muon detection apparatus 10 are recorded, for example, for each triggered muon, every fifth triggered muon or every odd triggered muon. One hence notes that not every detected muon is recorded, for example, due to a failed passing in the trigger condition set by an operational parameter 23. The command concerning recording interval may also be entered, for example, as an operational parameter 23.

In another preferred embodiment the position and orientation data 25 of the position and orientation apparatus 24 of the muon detection apparatus 10 are recorded with predetermined time intervals.

There are many different types of positioning apparatus commercially available for integration in geophysical borehole logging tools. These positioning apparatus include electronic multi-shot systems (EMS), gyroscopes, offset type systems and mechanical systems. The EMS systems, for example, have sensors that measure the gravity and magnetic field to provide the inclination and direction or azimuth of the instrument at specific position in the borehole. However, EMS apparatus are not applicable in areas of continuous or strong magnetic disturbance. The gyroscope systems, from which some are not affected by magnetism, include mechanical, optical and MEMS (Miniature Electro Mechanical System) gyroscope systems. The "north seeking" gyroscope systems, for example, allow surveys to be independent as such gyroscopes find their own reference direction. The offset type position apparatus (e.g., Fotobor and Maxibor) are not affected by magnetism and are usually optical systems. In this case the positioning measurements are carried out at fixed distance intervals (e.g., 3-metre intervals). Mechanical positions apparatus use compass and inclinometers. The mechanical positions apparatus are affected by magnetism and unlike the other above systems the mechanical positions apparatus do not generally have on-board data storage capabilities or an ability to transmit data to surface devices.

The position and orientation apparatus 24 of the muon detection apparatus 10 may be of any type described above. Depending on requirements it may also be of any other type as long as the given position and orientation apparatus 24 provides adequately accurate position and orientation data 25.

In one preferred embodiment the muon detection apparatus 10 is equipped with a plurality of position and orientation apparatus 24 in order to enhance spatial accuracy or for the QA/QC purposes.

In another preferred embodiment the position and orientation data 25 of the position and orientation apparatus 24 of the muon detection apparatus 10 are used to verify previous position and deviation surveys or to provide position and deviation data for boreholes 88, wells and the like, if this information is lacking.

In yet another preferred embodiment the data and information are encrypted and password protected.

The invention has many applications, such as but not limited to, mineral exploration and mining, oil and gas exploration and extraction, groundwater exploration, hydrological groundwater studies, lithology, stratigraphy studies, rock boundary studies, structural geological research and engineering. The engineering projects may span from geo-engineering to engineering, for example, structural integrity studies of such constructed sites as bridges, dams, harbours, tunnels and buildings and such natural objects as mountain slopes, cliffs, caves and river banks. The invention is particularly useful in mineral exploration and mining wherein it may be employed, for example, in both greenfield and brownfield mineral exploration boreholes. "Greenfield exploration" refers to mineral exploration conducted in relatively uncharted territory, where mineral deposits are not known to exist or where there exists only limited information regarding mineralisation. "Brownfield exploration", on the other hand, refers to mineral exploration conducted either near a closed mine or in an operational mine. Typically there are more boreholes in brownfields mineral exploration sites than those in greenfields mineral exploration sites. Brownfields projects are hence typically more advanced than greenfields projects.

In one preferred embodiment the muon detection system 100 may be applied, for example, to lithological density characterisation, stratigraphic correlation, lithological correlation between boreholes 88 and detection of major structural fault zones and mapping of hydrothermal alteration patterns. In another preferred embodiment the invention may be employed in greenfields and brownfields mineral exploration sites.

The obtained results of the muon detection campaign using the invention guide making decisions for further work. In mineral exploration and mining, for example, there are numerous geological, geochemical and geophysical research methods and hence numerous different types of data. However, many of these methods and data types are not numerical, and those that are, are not always spatially very precise or accurate. The muon measurement data of the muon detection system 100 are both numerical and spatially accurate data in terms of recognising and locating density variations 21 in material. Therefore, the muon measurement data of the muon detection system 100 will be appreciated by someone skilled in the art as the invention provides means to capture direct density data of the target with a method that is completely independent of other research methods. Muon measurements with the muon detection system 100 provide means to locate and characterise density variations 21 in terms of their density, depth, shape and size. Muon measurements may also be combined with other types of data, for example, lithological information, geochemical assays, structural data, seismic data, electrical data, electromagnetic data and gravimetric data. Note that by definition the volume of the subsurface measurement volume 19 depends on the number of used muon detection apparatus 10 and how they are arranged (i.e., positioned).

For someone skilled in the art of mineral exploration, oil and gas exploration or ground water exploration, data obtained and information generated using the invention are valuable, for example, in the targeting stage of the exploration. A dedicated exploration targeting focuses onto those areas that have the highest potential for discovery. This so-called exploration potential, or mineralisation potential in the case of mineral exploration, is based on the analysis of all relevant data. However, someone skilled in the arts such as geology, geoengineering, civil engineering and climate studies, just to name but a few, will appreciate that the exploration application of the invention is just one of the many useful applications of the invention. Indeed, the muon detection system 100 may be used for evaluating targets that may have value for the human societies.

In one preferred embodiment the revealed density variations 21 guide further drilling by suggesting that additional drilling is required within the already drilled volume (i.e., the subsurface measurement volume 19). In another preferred embodiment the revealed density variations 21 suggest that additional drilling is required beyond the limits of the already drilled volume. In this case the density variations 21 may continue beyond the limits of the already drilled volume. In another preferred embodiment the revealed density variations 21 suggest that additional drilling is not worthwhile, unless there are other reasons for additional drilling. In another preferred embodiment the revealed density variations 21 guide further research, such as additional geological observations and sampling, geochemical sampling and geophysical surveying. In yet another preferred embodiment the subsurface measurement volume 19 is too homogenous to reveal sufficient density variations 21 suggesting that additional drilling is not required, unless the present boreholes 88 are drilled deeper first.

The revealed density variations 21 guide the economic evaluation process of the target of interest by providing density information. For example, in an early-stage mineral exploration exact density data are rarely available and if such data are needed for conducting economic calculations subsequent first economic evaluations are based on approximated density values (as there is no option). Therefore the first estimates of the grades and tonnages are based on the data that are seldom as accurate as desired. However, this undesired situation can significantly be improved by the muon detection system 100. Similarly, the muon detection system 100 may be used for evaluating targets that may have economic value, such as oil and gas deposits and groundwater resources.

The revealed time-sequential density variations 21 guide the economic evaluation process of the target of interest by providing information on temporal density changes. For example, the resources and reserves of hard rock mineral deposits are typically calculated by using the densities determined from the drill core and/or surface rock samples, simply ignoring the rock water contents because the water contents are typically low. However, if the deposit has a high level of porosity and water content, as is the case with many weathered mineral deposits and some not-yet-lithified mineral deposits, the water content must be taken into account while evaluating the economic value of the mineral deposit. In such cases the time-sequential muon data of the muon detection system 100 may significantly improve the estimates of water contents and hence also improve economic evaluations, assuming there are temporal variations in the water contents. Furthermore, if there are no seasonal fluctuations in the time-sequential muon data the system is either dry, saturated with water or the temporal variations in density are insignificant.

In one preferred embodiment the density information provided by the muon detection system 100 is used to produce completely independent porosity and/or permeability estimates of the target rocks. This may be valuable, for example, for the oil and gas industry, soil studies, hydrological groundwater research and civil engineering purposes.

In another preferred embodiment the density information provided by the muon detection system 100 increase the understanding of the hydrocarbon basin. Therefore the muon detection system 100 can be used in oil and gas exploration. In yet another preferred embodiment the density information provided by the muon detection system 100 guide the economic evaluation of oil and gas deposits by providing valuable density information.

The muon detection system 100 can also be employed as a key tool for strategic planning. Drilling is one of the most, if not the most expensive exploration method used in mineral exploration. Hence, a lot of effort is put into a planning where to drill next. The drilling decisions are typically based on careful and time-consuming analysis of all available data (e.g., geological observations, geochemical assays, geophysical survey data, and geological models). A good example applying the muon detection system 100 for drill planning is to drill the boreholes 88 evenly in a small grid with equal depths and subsequently position the muon detection apparatus 10 in a similar manner in each borehole 88 of the said grid. Such a systematic arrangement of muon detection apparatus 10 yields muon measurement data that span nearly the whole volume of the grid from the surface (for example, the ground surface 18) close to the depth of the lowermost muon detection apparatus 10 as the separate conical volumes of detected muons are superimposed. Further expansion of the drill grid and relocating the muon detection apparatus 10 in the new boreholes 88 depend on the results of the previous setup of the muon detection system 100.

Mining commonly influences the quality and quantity of water in the mine area and in its surroundings, for example by changing local hydrological conditions. Therefore water management is an important part of a mining operation.

In one preferred embodiment the density information provided by the muon detection system 100 is used for monitoring water quantities in the surface of a mine area. Depending on the characteristics of the mine, the muon detection system 100 may be applied as a part of the site-specific water control system for monitoring water levels or seepage of natural waters (both groundwater and surface waters), wastewaters and used waters (such as tailings and dams).

Local hydrological conditions may also be affected by underground workings and indeed some man-made cavities have constant groundwater control challenges. For example, catastrophic water inrush is a hydrogeological disaster that occurs suddenly in an underground mine or a tunnel construction site, unless the potential environmental consequences of all operations are well understood. Even if such disasters are prevented, a slow seepage of groundwater to underground cavities, for example via water-saturated structural faults, may result in technical problems and economic losses since excess waters must be pumped out from the cavity.

In one preferred embodiment the density information provided by the muon detection system 100 is used to investigate groundwater inflow patterns into the natural and man-made cavities such as caves, tunnels, underground mines and civil engineering construction sites. The hydrogeological studies may be conducted as time-sequential 1.5D, 2.5D or 3.5D muon surveys, although also other density imaging modes of the muon detection system 100 are potentially useful.

In another preferred embodiment the density information provided by the muon detection system 100 is used for monitoring groundwater flow in underground mines, caves, tunnels and tunnel construction sites and their surroundings. In this case the muon detection system 100 is part of the site-specific water control system (i.e., water management).

Some advantageous embodiments of the system, method and computer program products according to the invention have been described above. The invention is not limited to the embodiments described above, but the inventive idea may be applied in numerous ways within the scope of the claims.

The invention claimed is:

1. A muon detection system for investigating density variations of materials, the muon detection system comprises:
   at least one muon detection apparatus, which muon detection apparatus comprises a scintillation detector part, matrix detector and position and orientation apparatus, which muon detection apparatus is configured to:
      detect in the scintillation detector part emitted photons by the matrix detector, which in the scintillation detector part emitted photons result from cosmic-ray induced muon particles passing via a plurality of intersecting muon trajectories through the material situated in a subsurface measurement volume of the muon detection apparatus;
   which position and orientation apparatus is configured to:
      determine the position and orientation of the muon detection apparatus and produce position and orientation data of the muon detection apparatus;
   wherein the muon detection system further comprises:
      at least one decentralized DAQ system comprising a surface part and a detector part, said DAQ system configured to:
         receive operational commands;
         process the photon signals of detected photons into the form of a muon recording;
         send the position and orientation data and the muon recording; and
         send operational parameters from the surface part of the DAQ system to the detector part of the DAQ system;
      at least one supporting system, configured to:
         position at least one muon detection apparatus to receive the muon recording from the subsurface measurement volume;
      a processing unit, configured to:
         send operational commands;
         collect at least one muon recording;
         collect the position and orientation data of at least one muon detection apparatus;
         extract material densities from the subsurface measurement volume by utilising at least one muon recording; and
         merge extracted material densities from the subsurface measurement volume into a density distribution map.

2. The muon detection system according to claim 1, wherein the supporting system is further configured to reposition at least one muon detection apparatus.

3. The muon detection system according to claim 1, wherein the muon detection system further comprises the electrical energy storage device, configured to deliver electricity for at least one device selected from the muon detection apparatus, DAQ system and communication hub device.

4. The muon detection system according to claim 1, wherein the muon detection system further comprises at least one server, configured to be connected via a communication network to the communication hub device.

5. The muon detection system according to claim 4, wherein the server is the processing unit.

6. The muon detection system according to claim 4, wherein the muon detection system further comprises a remote computer, configured to be connected to at least one server via the communication network or local connection means, which remote computer is the processing unit.

7. The muon detection system according to claim 1, wherein the muon detection system further comprises at least one communication hub device, configured to transfer data, which data comprises any of the muon recording, operational commands, operational parameters, position and orientation data and operational variables between at least one muon detection apparatus and the processing unit.

8. The muon detection system according to claim 1, wherein the communication hub device further comprises a local computer, which local computer is the processing unit.

9. The muon detection system according to claim 1, wherein the muon detection system further comprises a weather station, configured to be connected via the communication hub device to the processing unit, which weather station is configured to produce meteorological measurement data from the region of the muon detection system.

10. The muon detection system according to claim 9, wherein the meteorological measurement data comprises at least one measurement selected from temperature, wind direction, wind speed, gust speed, atmospheric pressure, relative humidity, cloud amount, snow depth, sunshine duration, ultraviolet irradiance measurement and air quality observations.

11. The muon detection system according to claim 9, wherein the processing unit is further configured to combine the meteorological measurement data with the muon recording.

12. The muon detection system according to claim 1, wherein the scintillation detector part comprises a plurality of optically separated scintillation bars, which scintillation bars are equipped with at least one matrix detector each.

13. The muon detection system according to claim 1, wherein the scintillation detector part comprises of scintillation material mounted in an optically isolating matrix framework, in which each compartment is equipped with at least one matrix detector.

14. The muon detection system according to claim 1, wherein the muon detection apparatus is configured to fit in a borehole of 100 mm or less in diameter.

15. The muon detection system according to claim 1, wherein the electrical energy storage device is further configured to be recharged by at least one energy source selected from a solar panel, windmill, hydroelectric power generator or aggregate.

16. The muon detection system according to claim 1, wherein the supporting system further comprises a detector connecting cable, which detector connecting cable encloses:
a communication cable, configured to transfer data between the surface part of the DAQ system and connected muon detection apparatus and deliver electricity to the connected muon detection apparatus; and
a mechanical cable, configured to position the connected muon detection apparatus.

17. The muon detection system according to claim 16, wherein the muon detection system further comprises a plurality of muon detection apparatus, interconnected through the detector connecting cable serially to each other.

18. The muon detection system according to claim 1, wherein the muon detection apparatus further comprises a first communication device, configured to transfer data between the DAQ system and communication hub device.

19. The muon detection system according to claim 1, wherein at least one muon detection apparatus further comprises a second communication device, configured to collect muon recordings from the interconnected muon detection apparatus and transfer the data between the second communication device and the communication hub device.

20. A method for investigating material densities with a muon detection system, the method comprising method steps:
activating a muon detection apparatus by sending operational commands by using a processing unit;
receiving the operational commands by using a decentralized DAQ system comprising a surface part and a detector part;
sending operational parameters from the surface part of the DAQ system to the detector part of the DAQ system;
detecting in a muon detection apparatus located scintillation detector part emitted photons with a matrix detector, which emitted photons result from cosmic-ray induced muon particles passing via a plurality of intersecting muon trajectories through the material situated in the subsurface measurement volume of the muon detection apparatus;
processing the signals of detected photons into the form of a muon recording by using the DAQ system;
determining the position and orientation of the muon detection apparatus and producing position and orientation data of the muon detection apparatus by using a position and orientation apparatus;
sending the position and orientation data and muon recording from at least one muon detection apparatus via a communication hub device to the processing unit; and
processing at least one muon recording by using the processing unit, which processing steps comprise:
collecting at least one muon recording;
collecting the position and orientation data of at least one muon detection apparatus;
extracting density variations from the subsurface measurement volume by utilising at least one muon recording and position and orientation data of at least one muon detection apparatus; and
merging the extracted density variations from the subsurface measurement volume into a density distribution map.

21. The method according to claim 20, wherein sending operational parameters of the muon detection apparatus by using the DAQ system to the processing unit.

22. The method according to claim 20, wherein transfer data, which data comprising any of the muon recording, operational parameters, and position and orientation data from at least one muon detection apparatus via the communication hub device to at least one server, wherein the transferred data are processed into the density distribution map.

23. The method according to claim 20, wherein collecting meteorological measurement data from a weather station via the communication hub device to the processing unit, which meteorological measurement data comprises at least one measurement selected from temperature, wind direction, wind speed, gust speed, atmospheric pressure, relative humidity, cloud amount, snow depth, sunshine duration, ultraviolet irradiance measurement and air quality observations.

24. The method according to claim 20, wherein combining the meteorological measurement data with the muon recordings by using the processing unit.

* * * * *